INVENTOR
MOSTAFA TOOSSI
ATTORNEY

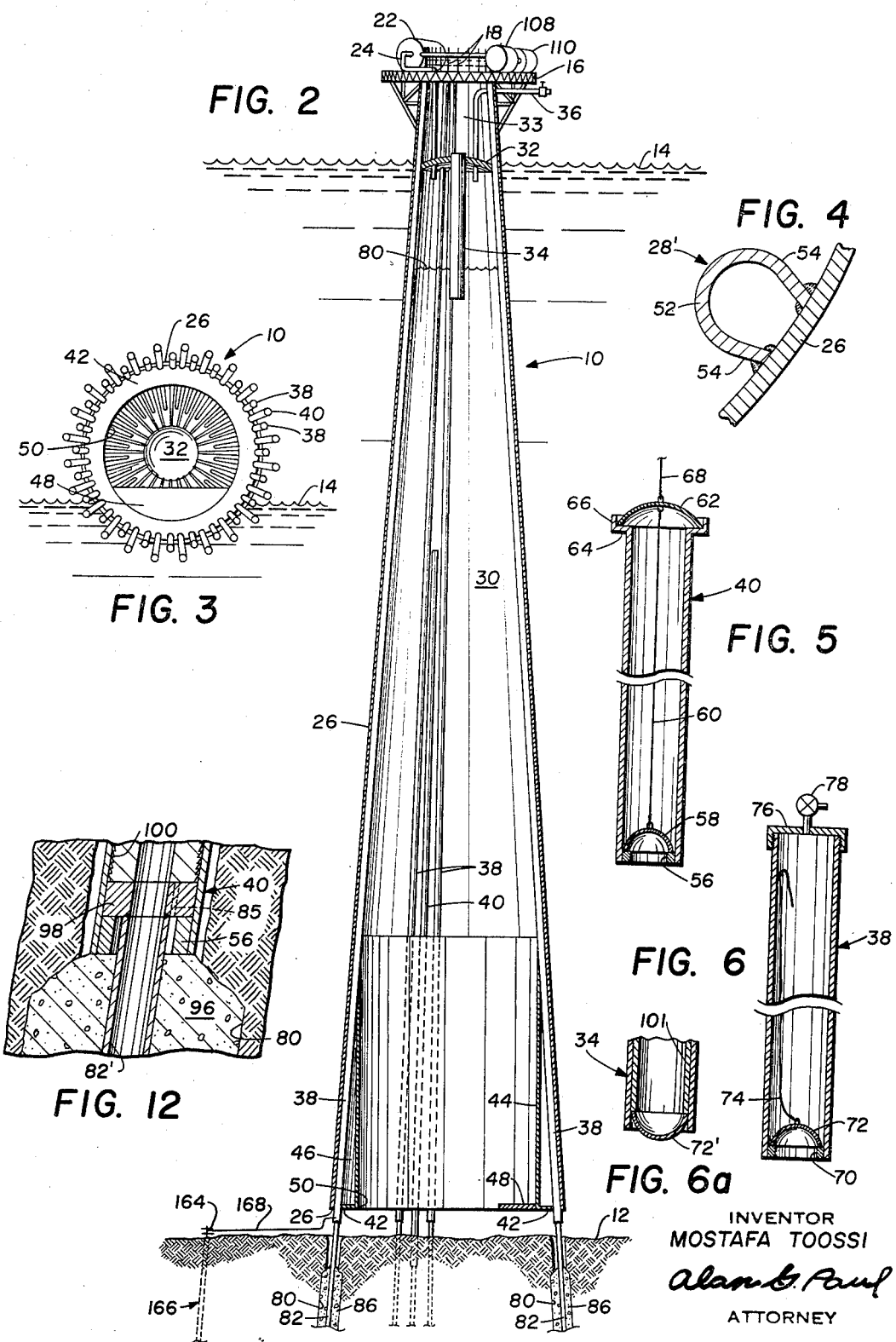

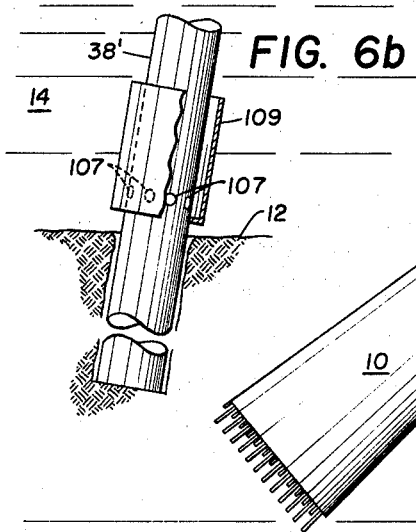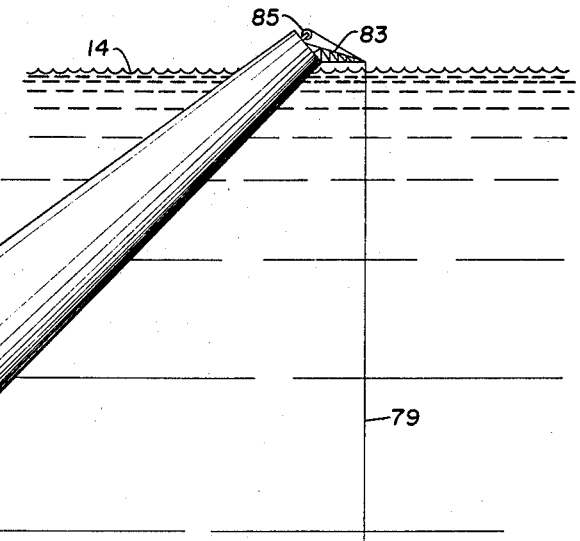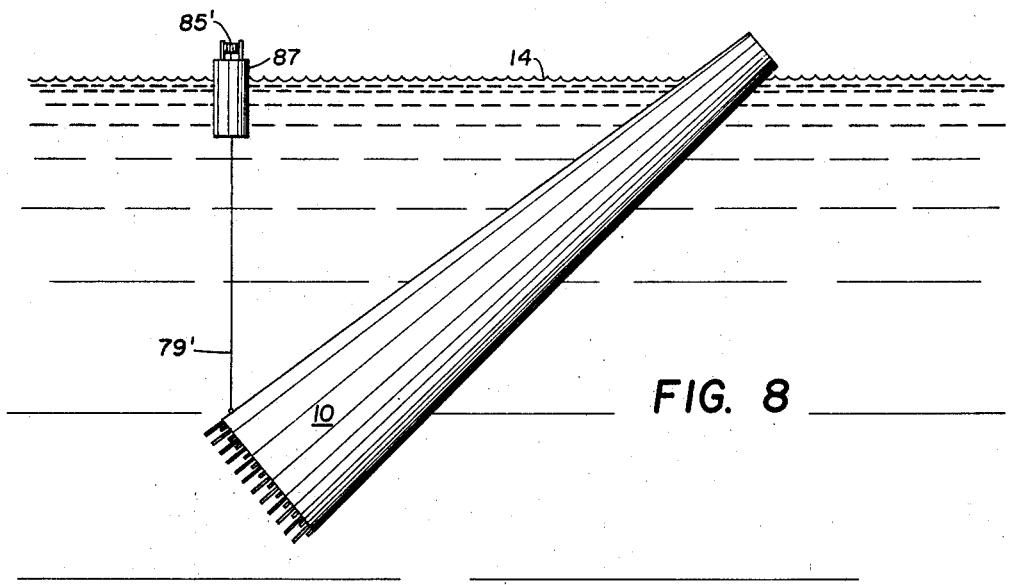

Jan. 13, 1970  M. TOOSSI  3,488,967
COMBINATION DEEP WATER STORAGE TANK AND
DRILLING AND PRODUCTION PLATFORM
Filed March 23, 1967
7 Sheets-Sheet 4
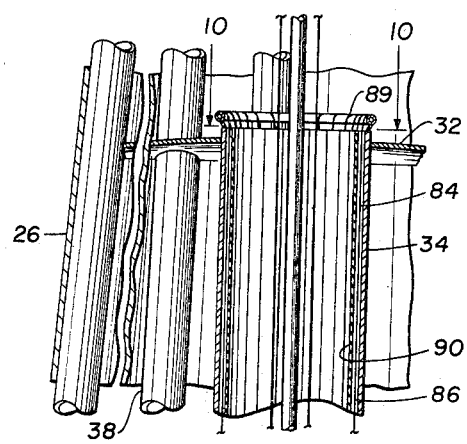
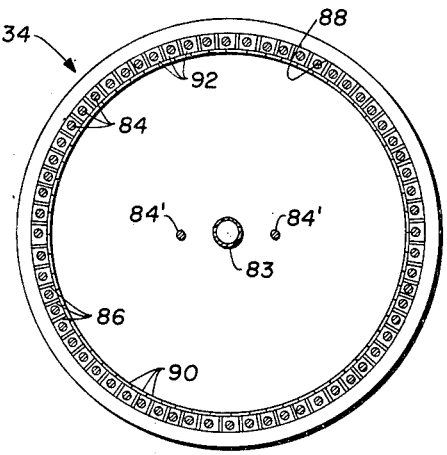
FIG. 10
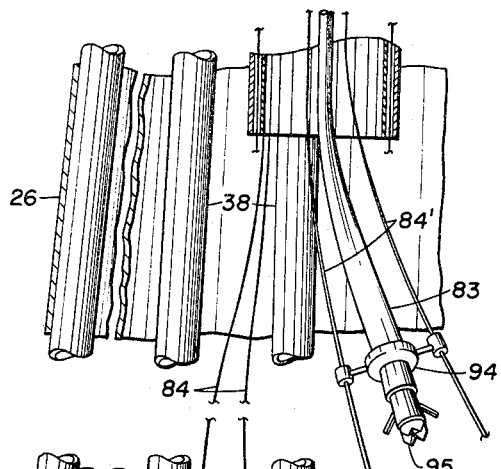
FIG. 9
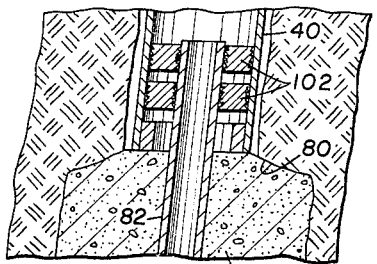
FIG. 13
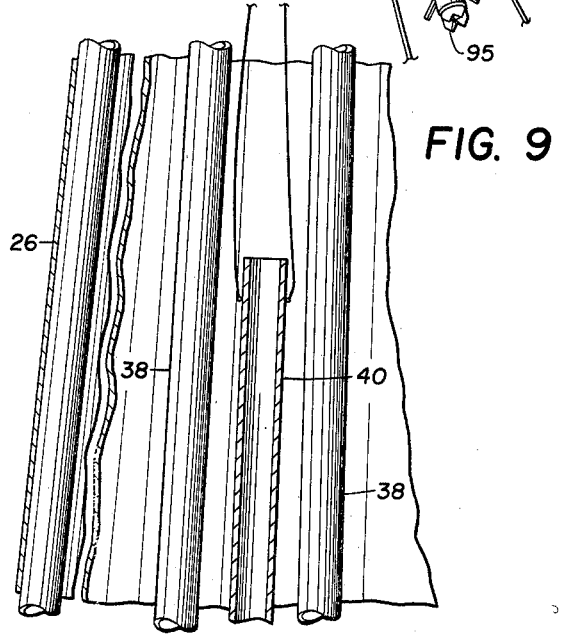
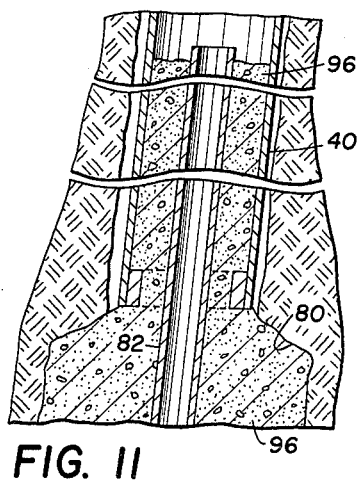
FIG. 11
INVENTOR
MOSTAFA TOOSSI
Alan G. Paul
ATTORNEY

INVENTOR
MOSTAFA TOOSSI
ATTORNEY

Jan. 13, 1970

M. TOOSSI 3,488,967

COMBINATION DEEP WATER STORAGE TANK AND
DRILLING AND PRODUCTION PLATFORM

Filed March 23, 1967

INVENTOR
MOSTAFA TOOSSI

*Alan G. Paul*
ATTORNEY

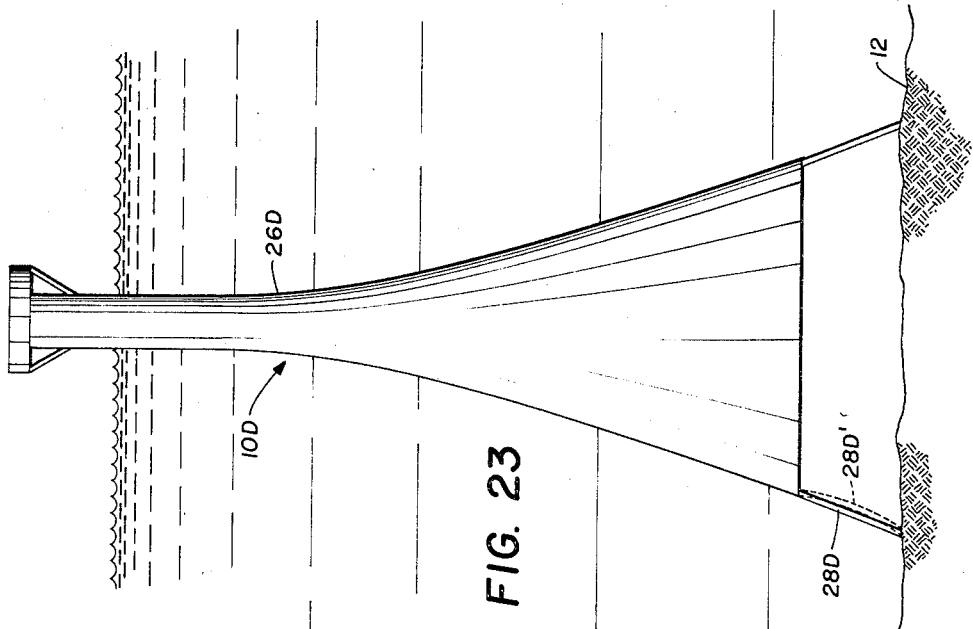
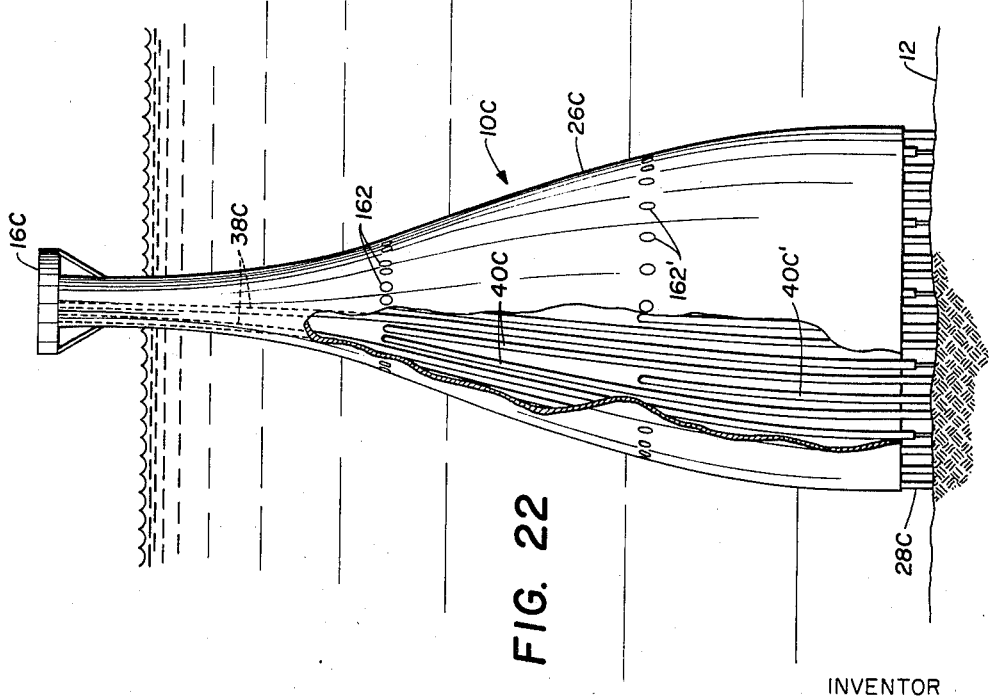

United States Patent Office 3,488,967
Patented Jan. 13, 1970

3,488,967
COMBINATION DEEP WATER STORAGE TANK
AND DRILLING AND PRODUCTION PLATFORM
Mostafa Toossi, Dallas, Tex., assignor to Mobil Oil
Corporation, a corporation of New York
Filed Mar. 23, 1967, Ser. No. 625,387
Int. Cl. E02b 17/00; E21b 15/02
U.S. Cl. 61—46.5        51 Claims

ABSTRACT OF THE DISCLOSURE

This specification discloses a marine structure to be installed at a deep water site, the structure comprising a plurality of hollow tubes anchored in the formations underlying the marine bottom and extending upward to form the skeleton of the marine structure. A shell encloses and is secured to the support tubes to form a storage space therewithin, at least some of the tubes continuing to a drilling-production deck atop the structure and functioning as well conductor pipes for drilling wells therethrough into the formations underlying the marine bottom to produce fluid minerals from subaqueous deposits. The produced fluids are stored in the storage space formed within the marine structure between visits of a tanker.

BACKGROUND OF THE INVENTION

Field of the invention

This invention relates to a marine structure for storing produced fluid minerals at a deep water production site. More particularly, the invention relates to a marine structure of a configuration that will permit production wells to be drilled and produced through structural members of a storage portion thereof in water depths up to a thousand feet or more, the wellheads being located on the upper end of the structure, either above the surface of a body of water or beneath, within diving depth.

Description of the prior art

Present developments in the offshore industry indicate that drilling and production efforts will be extended to undersea areas, such as the outer fringes of the continental shelves and the continental slopes, where the conventional type of bottom-supported above-surface platforms, such as the present jack-up mobile drilling rigs (see the Armstrong U.S. Patent 2,248,051 and the Le Tourneau U.S. Patent 3,044,269) and production templates (see the Alcorn et al. U.S. Patent 3,054,267 and the Hutchison U.S. Patent 2,901,890), are no longer economically and/or technically feasible. At these depths, it has been generally assumed that even in a proven field, floating drilling techniques, in combination with the utilization of a submarine production system, as illustrated by the Haeber U.S. Patent 3,261,398, are the most practical methods of exploiting the subaqueous deposits. The drilling of deep water wells entails the use of shipshaped vessels or semisubmersibles, anchored or dynamically positioned, for drilling the wells and for lowering the production equipment, including production satellites, wellheads, gathering systems, and storage tanks, to the marine bottom far below the surface of the body of water. Such a system is illustrated in the Bauer U.S. Patent 2,808,229. Floating drilling vessels, though expensive to rent or purchase, are a minor expense in comparison to that involved in developing and/or purchasing the required equipment for a submarine production system and for the servicing of such an operation with divers, robots, TFL (through flowline) tools, and/or articulated submersible vessels. It is obvious that with these presently envisioned techniques it would be possible only to develop the most prolific deep water fields.

Furthermore, the necessary storage facilities being large enough to accommodate, for example, five hundred thousand barrels of oil, accumulated between the periodic visits of an off-loading tanker, are unwieldy and expensive. A submerged storage tank, located far beneath the surface of the body of water and anchored in the formations underlying the marine bottom, would always be a source of danger. If it should break loose, everything above would be completely destroyed including any tankers being loaded. Also, there is a serious problem in transporting stored oil from a submerged storage tank, near the marine bottom, to a tanker on the surface. Single point mooring systems, not without their own problems, have been used, but never in as deep water as proposed here. A floating storage tank, as shown in the Shell British Patent specification 994,040, located at the surface or just beneath the turbulent water zone adjacent the surface and utilized in conjunction with an otherwise submarine system, while not as lethal a weapon as a storage structure located at the marine bottom, would be subject to the effects of surface storms, and if such a floating structure ever broke loose from its mooring lines, it could destroy any adjacent surface equipment while the mooring lines themselves could become tangled with the bottom-supported production equipment and uproot it. Mooring a vessel to a floating storage structure would be relatively simple, but the problem of transporting the above-mentioned oil from the production gathering system on the bottom to the floating storage structure would still be present.

SUMMARY OF THE INVENTION

In accordance with the present invention there is provided a marine structure for a deep water site, which would be securely anchored in the formations underlying the marine bottom, extending up to at least just below the turbulent water zone adjacent the surface, so as to withstand the loads imposed by the buoyancy of a storage space thereof when completely filled with oil or liquefied gas from the subaqueous field being produced. In the illustrated embodiments there is provided an anchored storage structure extending above the surface of the body of water in which it is located, the upper end of the structure being utilized as a drilling and production platform. While many possible shapes for the marine structure can be envisioned, a generally conical configuration appears to be the most satisfactory for most uses.

The marine structure, to be installed at a deep water site of subaqueous mineral deposits, comprises a skeletal arrangement of support tubes enclosed by a shell secured thereto to form a storage space therewithin. At least some of the support tubes extend down below the shell and into the formations underlying the marine bottom to anchor the structure. At least a portion of the anchoring support tubes function as well conductor pipes for subaqueous wells completed therethrough.

It is contemplated that a drilling, production, and storage structure such as this would be feasible for one thousand feet of water. A structure for that depth is calculated to weigh fifteen million pounds, and when floating on its side during transport, extends at least eleven hundred and fifty feet from end to end. The handling of such a gigantic structure at a deep water site presents problems. Several arrangements are discussed for controllably righting the marine structure and lowering it to the marine bottom. These consist of variable buoyancy compartments in the structure as well as surface buoys for buoyantly locating one end of the marine structure at the surface at all times.

To anchor the structure, boreholes must be drilled through at least some of the support tubes. Piles are then set through the support tubes into the boreholes and permanently locked within the lower ends of the support tubes while being cemented into the formations underlying the marine bottom. To stabilize the floating marine structure while it is being anchored, a tilt control system is activated. By means of the tilt control system, comprising in part a number of the support tubes, the center of buoyancy of the floating marine structure is shifted in response to wave and wind induced movements of the structure.

BRIEF DESCRIPTION OF THE DRAWINGS

FIGURE 2 is a schematic cross section of an elevational view of the marine structure of FIGURE 1.

FIGURE 3 is an elevational view of the marine structure, looking in from the open lower, large end of the shell thereof as the structure floats on the surface of a body of water while being transported to a marine site.

FIGURE 4 is a fragmentary cross-sectional view of the marine structure illustrating a modified embodiment of a support tube, forming a portion of the skeleton of the structure, welded along its length to the shell.

FIGURE 5 is a cross-sectional view of an auxiliary support tube, forming a portion of the skeleton of the marine structure, illustrating temporary sealing caps for the tube to provide buoyancy during the installation of the structure at a marine site.

FIGURE 6 is a cross-sectional view of a well conductor pipe, forming a portion of the skeleton of the marine structure, illustrating temporary sealing caps for the pipe to provide buoyancy during installation at a marine site.

FIGURE 6a is an elevational view of the lower end of a modified well conductor pipe with a piling section fixed therein prior to installation.

FIGURE 6b is an elevational view of the lower end of a modified well conductor pipe having ports therein for permitting free communication between the interior of the well conductor pipe and the surrounding body of water.

FIGURE 7 is an elevational view illustrating the reorienting of the structure from a floating axially horizontal position to the installed, axially vertical position at a marine site while positively locating the smaller end of the marine structure.

FIGURE 8 is an elevational view illustrating the reorienting of the structure from a floating, axially horizontal position to the installed, axially vertical position while buoyantly locating the large end of the marine structure.

FIGURE 9 is a cross-sectional fragmentary view of the marine structure of FIGURE 2 illustrating the procedure for drilling foundation holes through auxiliary support tubes.

FIGURE 10 is a cross-sectional view taken through line 10—10 of FIGURE 9 showing the construction of a central conduit, which permits a drill pipe string to extend through the roof of the storage space without releasing the air trapped thereunder for providing buoyant support of the marine structure.

FIGURES 11–13 are detail views illustrating various procedures for anchoring the marine structure through support tubes extending into the formations underlying the marine bottom.

FIGURE 22 is an elevational view of an embodiment of the marine structure wherein the shell configuration is such that the amount of oil that can be stored is maximized.

FIGURE 23 is an elevational view of an embodiment of the marine structure wherein the shell configuration is such that the surface area subjected to wave and/or wind forces is minimized and the foundation area is maximized with a structure for a smaller producing area.

DESCRIPTION OF SPECIFIC EMBODIMENTS

For purposes of illustration in the present discussion, it will be assumed that only oil is to be produced, although there is no reason why a generally similar design could not be utilized for the production and storage of gas, both gas and oil simultaneously, or any other fluid mineral, such as sulfur.

Figure 1:
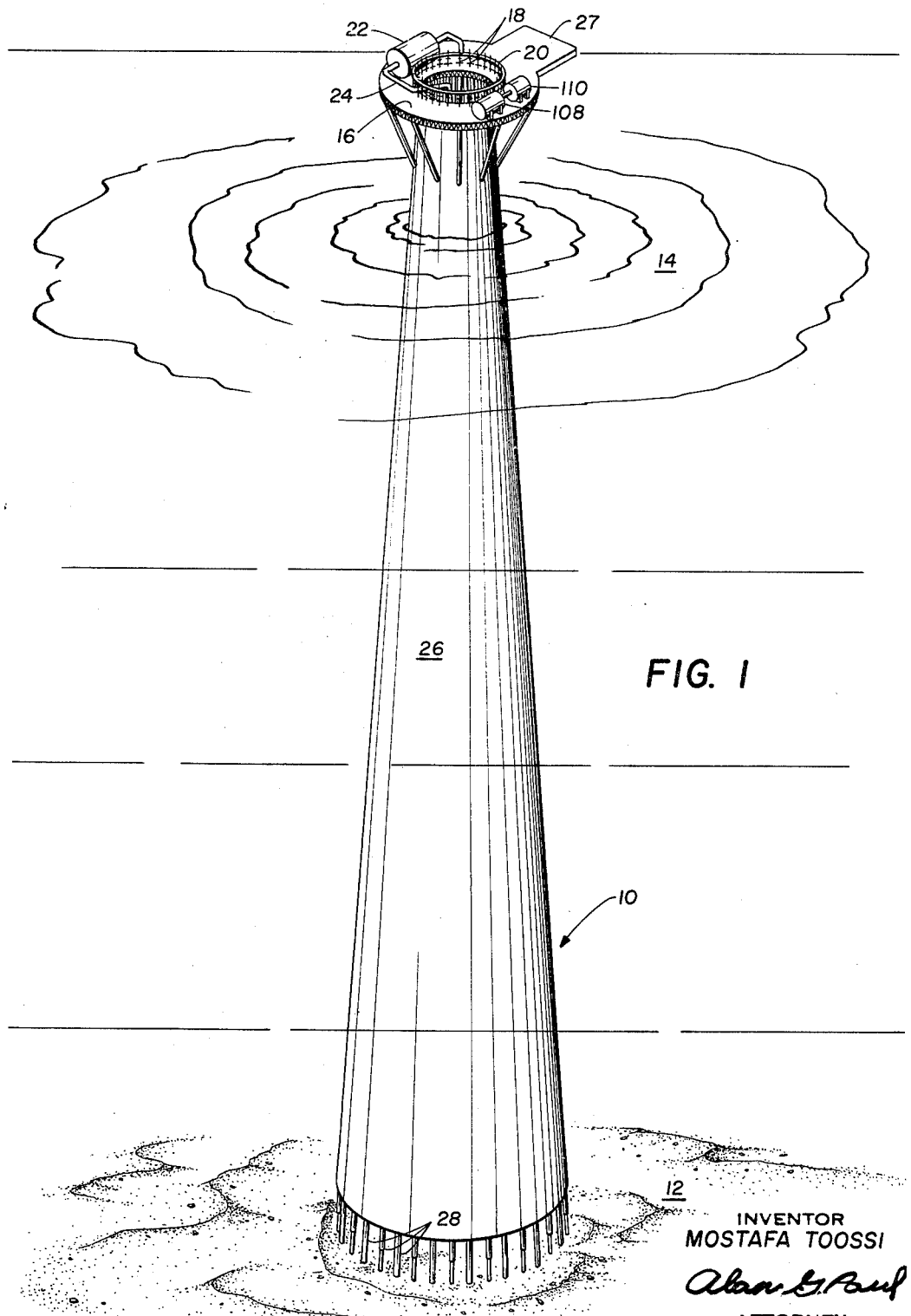
FIGURE 1 is a pictorial view of the marine structure, of the present invention, anchored in the formations underlying the marine bottom and extending above the surface of the body of water.

The water depth, for the illustration of FIGURE 1 is one thousand feet, although the structure is believed to be economically feasible from as shallow water as three hundred feet to considerably deeper water than one thousand feet, possibly as deep as two thousand feet, particularly if the upper end of the marine structure is designed to be submerged beneath the turbulent surface zone, but within easy diving depth. The illustrated structures, however, all extend far above the water surface for supporting first drilling and then production facilities at the deep water site.

Referring now to FIGURE 1, there is illustrated a marine structure, generally designated 10, having a configuration of a surface of revolution, generally resembling a frusto-cone. The marine structure 10 is supported in the formations underlying a marine bottom 12 and extends up through a thousand feet deep body of water to a point about one hundred feet above the water surface 14. A drilling and production deck 16 is fitted to the truncated upper end of the marine structure 10, and has a ring of production wellheads 18 mounted thereon and connected by a circular manifold 20 to oil-gas separation equipment 22 from which the oil is directed through a conduit 24 into a storage space defined, in part, by an outer skin or shell 26, which extends from a level spaced about thirty feet from the marine bottom 12 to the upper end of the marine structure 10 at a level above the water surface 14. The separated-out gas is flared utilized for artificial lift, or just pumped back into the formations. A projection 27 of the deck 16 provides room for a helicopter to land. Rather than the helicopter landing area being in the plane of the deck 16, it may be above the deck 16 in the actual case. In fact there may be two or more levels of the deck for whatever purposes this may be necessary.

A plurality of hollow support tubes, of substantially cylindrical cross section, generally designated 28, forming a skeletal arrangement to which the shell 26 is secured, depend about twenty feet into the formations underlying the marine bottom 12. The support tubes 28 of the skeletal arrangement, as being considered here for one thousand feet of water, are formed of steel, each thirty inches in diameter and with a wall thickness varying from six-tenths of an inch at the upper ends to one and one-half inches at the lower ends. One-half of the support tubes 28 extends from above the upper end to below the lower end of the shell 26, while the other half originates at a level below the upper end of the shell 26 and also extends below the lower end of the shell 26. The shell 26, for the particular size structure under discussion, is of six-tenths to seven-tenths inch steel in thickness and would be directly welded to the support tubes 28 to form a unit of extreme structural rigidity. The marine structure 10 is envisioned as having a diameter of about thirty feet at the production deck 16, a diameter of about thirty-five feet at the water surface 14 of the body of water, and a diameter of about one-hundred forty feet at the lower end of the shell 26. The unbuoyed weight of the marine structure 10, fabricated to these dimensions, approaches fifteen million pounds.

In the schematic representation of FIGURE 2, in which all but a few of the support tubes 28 have been deleted for illustrative purposes, a storage space 30 within the shell 26 is shown as being open to the sea, at its lower end, near the marine bottom 12, to provide communication between the storage space and the surrounding body of water and is capped at the upper end thereof at approximately the water surface 14 by a domed roof 32 within the shell 26, forming an upper space 33 between the roof 32 and the production deck 16. The upper space 33 may be enclosed and used for crews' quarters after the installation of the marine structure 10. A vertical central conduit 34 is fixed at its upper end in the roof 32 and depends into the storage space 30 for reasons to be explained later. A further conduit 36 extends horizontally out from below the production deck 16, at one end thereof, the other end depending at a right angle into the storage space 30, through the roof 32, to transfer stored oil into a waiting tanker (not shown).

Those of the support tubes, numerically designated 28 in FIGURE 1, that extend the entire length of the shell 26 of the marine structure 10, function as well conductor pipes, as well as providing structural support, and are designated 38 in FIGURE 2 and thereafter. A production wellhead 18 caps each well conductor pipe 38 of the completed wells for regulating the flow of oil from the well extending therebeneath into oil-bearing formations far beneath the marine bottom 12. The well conductor pipes 38 terminate in a single plane a few feet beneath the lower end of the shell 26. The actual number of well conductor pipes 38 is dictated by the number of oil wells that can be drilled directionally from the area defined by the lower end of the marine structure 10, and that will substantially aid in the draining of a subaqueous oil field therebeneath, as well as the number of well conductor pipes 38 and wellheads 18 that can be accommodated at the upper end of the marine structure 10. When considering the average subaqueous field for which a marine structure 10 such as this would be utilized, it is believed that thirty-two wells would be a good average approximation of the number needed to drain the subaqueous oil field. The number of support tubes 28, however, is not entirely dictated by the number of wells that will be drilled, but in part by structural requirements. A pair of well conductor pipes 38, not to be actually utilized as well conductors, could be substituted for the conduits 24 and 36 to transfer the oil into and out of the storage space 30. A well conductor pipe 38, substituting for a conduit 24 or 36, would have to have at least one port (not shown) through the wall thereof at the level of the lower end of the respective conduit being replaced and a bulkhead across the interior of the respective well conductor pipe 38 just below the aforementioned port.

Those of the support tubes, numerically designated 28 in FIGURE 1, that originate at a level below the upper end of the shell 26 of the marine structure 10 function as auxiliary skeletal supports, preventing the spacing between adjacent well conductor pipes 38 from becoming wide enough, toward the lower end of the structure 10, to allow the shell 26 to ripple or distort under the loads imposed thereon and are designated 40 in FIGURE 2 and thereafter. Considering the size of the structure under discussion and the thickness of the shell 26 proposed therefor, it is believed that an unsupported spacing of two and one-half feet between the adjacent support tubes 28 should be a maximum. In the illustrative model, one shorter auxiliary support tube 40 is located between each pair of adjacent well conductor pipes 38, all of the auxiliary support tubes 40 terminating in a common horizontal plane about fifty feet below the lower edge of the shell 26.

As shown in FIGURES 2 and 3, an inwardly extending circular lip 42, through which the support tubes 28 extend, is welded to the lower end of the shell 26. A cylindrical wall 44 (FIGURE 2), fitted within the storage space 30, extends upward from the inner edge of the lip 42, parallel to the axis of the marine structure 10, to the point of intersection with the shell 26 to which it is welded. The cylindrical wall 44, the lip 42, and the included lower portion of the shell 26 form a circumferential buoyancy chamber 46 of triangular cross-sectional configuration. The wall 44 can alternatively be generally conical or slightly curved to provide a buoyancy chamber of the specific capacity necessary. A chordal plate 48 may also be welded across a portion of a central opening 50 through the lip 42, as shown in FIGURES 2 and 3.

A preferred construction of a support tube 28', as shown in FIGURE 4, provides a comparatively simple and economical method for joining the elements of the marine structure 10. The support tubes 28', rather than being circular over their entire lengths, are each open in cross section over the length in contact with the shell 26. The cross section of the support tube walls each comprises a circular central portion 52 and tangent planar side portions 54, so that the tubes 28' do not abut the shell 26, in single line contacts, resulting in very small included angles, as is true with support tubes having circular cross sections. Therefore, the tubes 28' are welded to the inner wall of the shell 26 at an angle permitting complete welding without the voids and resulting structural failures that often accompany such a construction. The support tubes 28' are easily prefabricated, as by rolling, and some steel may even be saved by this procedure over the utilization of circular support tubes, along with a comparable weight saving, without any appreciable loss in strength. Of course, the sections of the tubes 28' beneath the lower edge of the shell 26 each have a contiguous circular wall.

Prior to transporting the completed marine structure 10 from the point of fabrication to a marine site at which it is to be installed, all of the support tubes 28 (or 28') are capped to seal them at their ends to provide buoyancy. To prevent the collapse of the closed support tubes 28 from hydrostatic pressures, in the thousand feet of water at which the structure is to be erected, the support tubes 28 are pressurized with air. The buoyancy chamber 46, which is airtight, is connected by a pair of hoses (not shown) to an accompanying work boat (also not shown) so that the weight of the structure in the water can be controlled.

The caps must be removed from the support tubes 28 after the structure 10 is righted in the water. The caps on the upper ends of the well conductor pipes 38 being above the water surface, on the deck 16, can be easily reached. However, the upper ends of the auxiliary support tubes 40 and the lower ends of all of the support tubes 28, being far below the surface at that time, present more of a problem. One solution to this problem is illustrated in FIGURES 5 and 6 where an auxiliary support tube 40 and a well conductor pipe 38, respectively, are illustrated. Looking at FIGURE 5, a stop ring 56 is welded within the lower end of the auxiliary support tube 40 and a cap 58 is installed in the lower end of the auxiliary support tube 40, abutting the stop ring 56 and locked therein against the circular wall of the auxiliary support tube 40, sealing it tightly thereto, i.e., by mechanical pressure applied from above to deform the cap 58 outwardly, or by tack welding, or any other appropriate means. A cable 60, connected to the cap 58, extends the length of the auxiliary support tube 40 and is connected to an upper cap 62 mounted on an upper flange 64 fixed on the upper end of the auxiliary support tube 40. The upper cap 62 may also be outwardly deformed, against a circumferential ring 66 of the flange 64, to hold it tightly in place.

The lower cap 58 is designed so that the differential pressure between the water outside and the air within the auxiliary support tube 40 will cause the lower cap 58 to break away and move up the respective tube 40 when the lower end of the auxiliary support tube 40 approaches the marine bottom 12. The cables 60 permits the lower cap 58 to be drawn completely out of the tube 40 and acts as a fail-safe device, for breaking the cap 58 free, if the water pressure does not function as anticipated. The upper end of the auxiliary support tube 40 is far beneath the surface of the body of water at the appropriate time for the upper cap 62 to be broken away (FIGURE 2) and therefore an upper cable 82 must be connected between the cap 62 and the production deck at the upper end of the marine structure 10. When the lower cap 58 breaks loose within the auxiliary support tube 40, the pressure within the tube 40 rises to equalize with the surrounding water pressure and the upper cap 62 can then be pulled loose with a comparatively small force by the cable 68. By retrieving the upper cap 62, the lower cap 58 is also retrieved through the agency of the interconnecting cable 60.

FIGURE 6 illustrates a well conductor pipe 38 having a stop ring 70 welded within the lower end thereof. As previously described with respect to an auxiliary support tube 40 (FIGURE 5), a lower cap 72 is sealably fixed within the well conductor pipe 38, abutting the stop ring 70. With the well conductor pipe 38, which extends all the way to the top of the structure 10, the upper end of a retrieval cable 74, connected to the lower cap 72, will be releasably fastened just inside the upper end of the pipe 38 where it may be reached as soon as an upper cap 76 is removed. The upper cap 76 is threaded over the open upper end of the well conductor pipes 38 so that it can be removed to reach the cable 74, for retrieving the lower cap 72 after it is broken free by the water pressure, as explained with respect to the lower cap 58 of the auxiliary support tube 40. With the upper ends of the auxiliary support tubes 40 being far beneath the surface 14 of the body of water when the upper caps 62 are removed, the pressured air therewithin is no problem. However, with the well conductor pipes 38, the upper ends of which are on the deck 16 of the marine structure 10, it is necessary to bleed off the air pressure from each through a valve 78 prior to removing the respective cap 76. After the cables 74 and the lower caps 72 have been removed from the well conductor pipes 38, the upper caps 76 are screwed back on so that the well conductor pipes 38 can be utilized as tilt control buoyancy/ballast tanks during the final stages of installation of the structure 10. The need for capping any of the support tubes 28 can be obviated by attaching enough supplemental ballast tanks along the length of the marine structure 10, but this solution entails its own problems, not the least of which are the additional weight and expense.

When the marine structure 10 has been fabricated, in a shipyard, and is to be transferred to a marine site, it is contemplated that all of the support tubes 28 are then capped, the buoyancy chamber 46 is sealed, and the chordal plate 48 is welded across the opening 50, after which the marine structure 10 will float on the surface 14 of the body of water as shown in FIGURE 3. Due to the concentration of support tubes 28 near the large end of the structure 10, and the increased wall thickness of each of these tubes at the large end, the center of gravity of the structure is near the large end. To permit the structure to float reasonably high, substantially above the surface 14, along its entire length, and therefore to transport it with the least amount of drag, and in shallow water, the center of buoyancy must be shifted toward the large end of the structure 10. This is accomplished, for the most part, by retaining, unflooded, the storage space 30 which has a greater volume at the large end of the shell 26, the chordal plate 48 being fixed over the open larger end of the shell 26 to form a dam, not permitting water to enter the shell 26 (FIGURE 3). The larger number of submerged buoyant support tubes 28 at the larger end adds some axially asymmetrical buoyancy. The marine structure 10 can be kept from rotating on its axis in the water by means of temporary outriggers or by tugs (not shown) connected to the marine structure 10 on either side thereof, although the chordal plate 48 provides enough eccentric weight in most situations.

When the marine structure 10 arrives at the site, floating high in the water as shown in FIGURE 3, it must be righted prior to being permanently anchored. The first step is to flood partially the storage space 30 by breaking away the plate 48, pumping water over the plate 48, or allowing water to enter through a valved port (not shown) preferably in the chordal plate 48. The partial flooding of the storage space 30 causes the shifting of the center of buoyancy of the marine structure 10 away from the large end thereof and thereby settling of the aforementioned large end down into the water. The buoyancy chamber 46 is then gradually flooded to cause the marine structure 10 to rotate further toward a vertical axial orientation at a predetermined angular velocity. As the structure 10 rotates toward a vertical axial orientation, the lower ends of the auxiliary support tubes 40, on the lower side, approach the marine bottom 12. To avoid a collision and the resultant bending or breaking of the auxiliary support tubes 40, the rotation of the structure 10 is interrupted, prior to contact, at a prescribed intermediate orientation, by pumping air into the buoyancy chamber 46, and thereby evacuating some of the water therefrom to shift the center of buoyancy back toward the large end. The next step is to increase the volume of air in the roofed storage space 30 to lift the upper end of the marine structure 10 further out of the water a prescribed distance and to rotate it into a vertical orientation. Communication with the storage space 30, for pumping air thereinto or bleeding air out, can be obtained by a removable valved cap (similar to the caps 76 shown in FIGURE 6, as provided for the well conductor pipes 38) fitted to the central conduit 34 or through either of the valved conduits 24 and 36. As the axis of the frusto-conical marine structure 10 becomes substantially vertical in the body of water, it is lowered by reducing the volume of air in the storage space 30 until the lower ends of the auxiliary support tubes 40 are just above the marine bottom 12. At this point the releasable caps 58, 62, and 72 are removed as previously described. To provide extra buoyancy at the upper end of the marine structure 10, during the reorientation process, the small end of the structure 10 can be capped, to for supplementary buoyancy chamber from the open space 33 within the shell 26, above the roof 32 capping the storage space 30. Such a buoyancy chamber in the small end will insure that, as the large end of the marine structure 10 is first lowered toward the marine bottom, the small end will remain at the surface, providing better controllability in the erection process.

Another method of reorientation is shown in FIGURE 7 where the marine structure 10 is moored by a cable 79, connected between the small end of the structure 10, and an anchor 81, to prevent the premature lifting of the smaller end of the marine structure 10. Preferably the anchor 81 is set upcurrent (if there is a current) of the marine structure 10 and is entrained over an extension or crane 83 fixed to the small end of the marine structure 10 so that as the structure 10 attempts to attain a vertical orientation, the cable 79 does not lie against the large end of the shell 26 of the marine structure 10. The mooring cable 79 can be connected directly to the near side of the small end of the marine structure, although in that case the cable 79 must be released before the marine structure 10 is completely vertical. A controlled playout drum 85 is mounted on the upper side of the small end of the marine structure 10 to adjust the length of the extended cable 79 as the marine structure 10 is righted. Alternatively, as shown in FIGURE 8, a cable 79' is attached between the larger end of the marine structure 10 and a surface float 87 for controlling the reorientation procedure. The controllable playout drum 85' is then mounted on the float 87 to adjust the length of the cable 79'.

It is improbable that the marine structure 10 will attain a fully vertical orientation as it is righted by any of the above-described methods; a weight eccentricity, winds, and/or currents, will cause some tilt in the freely floating structure. Therefore subsequent to the caps 58, 62, and 72 having been removed from the support tubes 28, air is allowed to escape very slowly from the storage space 30, causing the marine structure 10 to be submerged further into the body of water until the auxiliary support tubes 40, on the low side of the floating marine structure 10, become embedded a few feet in the formations underlying the marine bottom 12. The activation of a ballast-shifting tilt control system (to be described later), to stabilize the floating marine structure 10, is delayed until those of the auxiliary support tubes 40 on the low side of the structure are embedded in the formations underlying the marine bottom 12 to prevent the floating structure 10 from possibly rotating on its axis when a righting couple is applied by means of the tilt control system.

As the marine structure is stabilized, it attains a fully vertical orientation, the buoyancy thereof being regulated to keep the lower ends of the auxiliary support tubes 40 embedded within the formations underlying the marine 12. Between the anchoring effect of the auxiliary support tubes 40 and the stabilizing effect of the tilt control mechanism, the marine structure 10 will float almost immovably in the body of water. The platform 16, a drilling rig, and the necessary auxiliary drilling equipment are set on top of the floating marine structure 10, the buoyancy of the structure 10 being adjusted to compensate for the increase in weight. The structure is then lowered further into the body of water until the auxiliary support tubes 40 are forced into the formations underlying the marine bottom 12 to the prescribed final installation depth of twenty or so feet. The buoyancy of the structure is now regulated to hold the structure at the installation depth, the auxiliary support tubes 40 not being enough to fully support the entire weight of the structure 10 at this time.

The recapped well conductor pipes 38 are utilized as buoyancy/ballast tanks of the tilt control system, providing some buoyancy, most of the buoyancy being provided by the air trapped in the storage space 30. The well conductor pipes 38 must be airtight to function properly as buoyancy/ballast tanks of the tilt control system and therefore they are protected from the strains imposed on the ones of the support tubes 28 being driven into the marine bottom 12 by being substantially shorter. Such strains could conceivably destroy the integrity of an involved tube 28 by bending or cracking it. Since the auxiliary support tubes 40 serve no such additional function, it is not as important that the integrity of these tubes be so protected.

After the stabilization of the marine structure 10 has been accomplished, with the auxiliary support tubes 40 extending into the formations underlying the marine bottom 12 to the prescribed depth, a foundation borehole 80 (FIGURE 2) is drilled through each of the auxiliary support tubes 40 in turn and hollow piles 82 are inserted down through, being cemented into the formations underlying the marine bottom 12 and locked into the lower ends of the auxiliary support tubes 40. Communcation is provided between the upper ends of the auxiliary support tubes 40 within the storage space 30 and the drilling equipment on the production deck 16 by the central conduit 34 extending through the roof 32 of the storage space 30. The conduit 34 depends far enough into the storage space 30 to be beneath a depressed water line 79 (FIGURES 2 and 9) as the marine structure 10 is buoyantly supported by the air trapped beneath the roof 32. An open drill pipe string is guided into the upper end of one of auxiliary support tubes 40 from the deck 16, directly through the conduit 34, in the usual case where water is used as the circulation medium, although a marine conductor pipe (not shown), as well known in the art and disclosed in the Rand U.S. Patent 3,177,954, can bridge the distance between the lower end of the central conduit 34 and the upper end of the auxiliary support tube 40 where return circulation is desirable. Foundation boreholes 80 (FIGURE 2) are drilled consecutively through each of the auxiliary support tubes 40. With the setting of piles 82 in all of the boreholes 80 drilled through the auxiliary support tubes 40, the grouting of the piles 82 into the formations underlying the marine bottom 12, and the locking of these piles 82 within the respective auxiliary support tubes 40, a primary foundation for the marine structure is complete.

FIGURE 9 shows one way for guiding an open drill pipe string 83 on a marine conductor pipe (not shown) through the storage space 30 between the lower end of the central conduit 34 and the offset upper end of a fully submerged auxiliary support tube 40 within the storage space 30. The illustrated support tube 40 has a pair of guidelines 84 connected near the upper end thereof and extending through the central conduit 34. A pair of guidelines is similarly connected to each of the auxiliary support tubes, the upper ends of all the guidelines 84 being fastened around a circular rail 89 mounted on the roof 32 of the storage space 30 concentric with the central conduit 34. As shown in cross section of FIGURE 10 the conduit 34 has radial plates 86 rigidly affixed to the inner wall 88 thereof. Abutting flexible rubber strips 90 are mounted on the inner end of each of the radial plates 86 to form a continuous wall. Each of the guidelines 84 is contained in a compartment 92 defined by an adjacent pair of radial plates 86, the respective pair of overextending abutting rubber strips 90, and the inner wall 88 of the central conduit 34. This construction permits the guidelines 84 to be stored separately where they will not be damaged by or become entangled with the rotating drill pipe string 83 extending through the conduit 34 but may be easily reached by personnel above the roof 32. To release a guideline 84 one merely must pull the respective guideline 84 across the upper open end of the conduit 34 to draw it out at least partially from the compartment 92 where it has been held. A pair of guidelines 84' are shown (in FIGURE 9) withdrawn from their compartments 92 in the wall of the conduit 34. The upper ends of the guidelines 84' have been released from the rail 85 and are tensioned at their upper ends (not shown) so that the drill pipe string 83 can be guided down along the guidelines 84' and into the respective auxiliary support tube 40, out of view at the right, in conjunction with a transverse guide bar 94 rotatably journaled at the lower end of the drill pipe string 83 just above an overreaming drill bit 95. A guideline system similar in many respects to that disclosed in the instant application is discussed in detail in the R. F. Bauer et al. Patent 2,808,229, issued Oct. 1, 1957.

The sudden bending of the drill pipe string 83 as it enters the upper end of an auxiliary support tube 40 within the storage space 30 may be controlled with the use of a tiltable collar or bushing, as shown in the L. G. Otteman et al. Patents 3,142,343 and 3,142,344 issued July 28, 1964, mounted atop the auxiliary support tube 40. A flexible ring, as also shown in the Otteman patents, may be releasably mounted in the lower end of the conduit 34 to prevent too great a bend in the drill pipe string 83 as it bears against the lower end of the conduit 34, if this appears necessary. If such a ring is used it must be removable when the drill pipe string 83 is out of the central conduit 34 to permit pairs of guidelines 84 to be withdrawn from the respective compartments 92 in which they are stored. The design of handling tools to be connected to the end of a drill pipe string, for inserting or removing the above-mentioned flexible ring, are well within the skill of a mechanic in the art.

If a marine conductor is used between the lower end of the central conduit 34 and the upper end of the auxiliary support tube 40 a single guideline may be used in conjunction with each auxiliary support tube 40. In this case each of the guidelines (not shown) has a weight attached to the lower end thereof and is hung down in the respective auxiliary support tube 40. A marine conductor pipe is threaded down over one of the weighted guidelines to the respective auxiliary support tube 40. There must be enough weight on the lower end of the single guideline to tension the guideline sufficiently to bring the lower end of the conductor pipe in line with the upper end of the respective auxiliary support tube 40. After the marine conductor pipe is connected to the upper end of the auxiliary support tube 40, the guideline can be withdrawn completely. Many other possibilities exist for bridging the space between the lower end of the conduit 34 and the upper ends of the auxiliary support tubes 40. Among these is the using of a diver or robotic device in the flooded storage space 30. Such a diver or robot can gain access to the storage space 30 through the conduit 34.

The primary foundation, consisting of foundation members comprising the auxiliary support tubes 40, anchored in the formations underlying the marine bottom 12, is enough to support the marine structure 10 against normal wind, wave, and current loads. Once the primary foundation has been completed, the trapped air is released from the storage space 30 through either of the valved conduits 24 or 36 and the well conductor pipes 38 are also flooded by removing all of the screwed-on upper caps 76 (the previously mentioned tilt control system being disconnected) so that the structure 10 is fully supported in the marine bottom 12. As wells are drilled through each of the well conductor pipes 38, the respective well conductor pipe 38 becomes an additional foundation member providing an even more rigid base. By the time some of the wells are completed and placed on stream and the storage space 30 is starting to store oil, the foundation is quite capable of resisting the upward buoyant force of the water-displaced oil as well as the lateral loads caused by any violent storm.

In the previous discussions it has been considered that the well conductor pipes 38 extend just below the shell 26 while the auxiliary support tubes 40 extend further, about fifty feet below the shell 26. However, to avoid the complicated procedure just described, where the central conduit 34, in conjunction with guidelines 84, is needed for locating the upper ends of the auxiliary support tubes 40, it may be desirable to form the primary foundation in conjunction with those of the support tubes 28 that extend all the way to the upper end of the shell 26. In such an embodiment it would be the well conductor pipes 38 that would extend fifty feet or so beneath the shell 26, the auxiliary support tubes 40 terminating just below the shell 26. The original foundation boreholes 80 are drilled through the well conductor pipes 38 from the production deck 16 without the necessity of broaching the roof 32 under which the air is trapped to provide buoyancy for the marine structure 10. To form the primary foundation in conjunction with the well conductor pipes 38, it is necessary to utilize the auxiliary support tubes 40 as the buoyancy/ballast tanks of the tilt control system. The loss of several hundred feet of length in those of the support tubes 28, which provide supplemental buoyancy for the marine structure 10, is not a major problem. When this procedure is followed, the integrity of the roof 32 of the storage space 30, after the primary foundation is formed, is of little import since the structure is then self-supporting. Therefore, the central conduit 34 and all of the complications that it entails can be dispensed with.

After each of the well conductor pipes 38 has been anchored in the formations underlying the marine bottom 12, completing the primary foundation, the marine structure 10 is self-supporting and therefore the roof 32 within the structure 10 can be removed to permit easy access to drill the remaining foundation boreholes 80, and set the remaining piles 82, through the auxiliary support tubes 40. Alternatively, multiple ports (not shown) are formed in the roof 32, one in line with each of the auxiliary support tubes 40. A threaded plug (not shown) would be provided for each of the ports in the roof 32, and after the primary foundation had been formed in conjunction with the well conductor pipes 38, these ports in the roof 32 are opened for the remainder of the foundation boreholes 80 to be drilled and set through the auxiliary support tubes 40. The previously discussed method for disposing of the upper and lower caps 58 and 62 of the auxiliary support tubes 40 cannot be utilized in this embodiment. The upper caps of the auxiliary support tubes 40 must not be removed, in this embodiment, until the primary foundation formed in conjunction with the well conductor pipes 38 is finished. The upper caps of the auxiliary support tubes 40 would therefore either be made of drillable material, and be permanently fixed to the upper ends of the support tubes 40, or be threaded on, each having an upstanding handling head so that they may be unthreaded by a tool connected to the lower end of a handling string. The lower caps in these auxiliary support tubes 40 are removable without first removing the upper caps, due to the obvious problems involved. These lower caps could be of a frangible material such as a baked ceramic, so that, rather than deforming when encountering a large pressure differential on opposing faces thereof, far beneath the surface of the body of water, they break up into small pieces which will then drop out and be no problem. Alternatively, air can be pumped in through the upper ends of the auxiliary support tubes 40 to overcome the outside water pressure and either fracture the lower caps or drive them off if they are not frangible. A fluid pressure line (not shown) is connected to the interior of each of the auxiliary support tubes 40, preferably through the permanently fixed upper cap thereof, and these pressure lines extend through a sealed opening (not shown) in the roof 32 of the storage space 30 to the production deck 16 where they are connected into the tilt control system. These fluid pressure lines, connected to the caps of the auxiliary support tubes 40, could then serve as guidelines for directing a drill pipe string or a marine conductor through the water within the storage space 30.

The specific method and apparatus for fabricating a foundation member in situ is now discussed in conjunction with FIGURES 2 and 11. During the operation, the marine structure 10 is buoyantly supported with all of the auxiliary support tubes 40 penetrating the formations underlying the marine bottom 12 the prescribed distance and the tilt control system activated so that the structure is held as steady as possible. The foundation boreholes 80, four to four and one-half feet in diameter, and several hundred feet in depth, are first drilled through each of the thirty-inch diameter auxiliary support tubes 40 utilizing a drill bit 95 having an upper underreamer (FIGURE 9), as is well known in the art. The piles 82 are then guided down through the respective auxiliary support tubes 40 and into the prepared foundation boreholes 80 and are grouted in place, the grout 96 not only filling the foundation boreholes 80 but also the annuli between the piles 82 and the inner walls of the auxiliary support tubes 40. If the gout 96 will not bond the piles 82 satisfactorily to the auxiliary support tubes 40, to withstand the cantilever loads on the marine structure 10, either because of insufficient surface area for the bond between the piles 82 and the respective auxiliary support tubes 40, or because of relative movement between the piles 82 and the auxiliary support tubes 40 during the setting up of the grout, not entirely eliminated by the tilt control system, other procedures must be followed in which any movement of the marine structure 10 can be isolated from the setting grout.

Looking to FIGURE 12, an arrangement is illustrated in which the locking of a pile 82' within an auxiliary support tube 40 is not dependent on the cement bond therebetween. Each modified pile 82' has a circumferential external flange 98 formed on the upper end thereof for mechanically locking the pile 82' into the respective auxiliary support tube 40. The pile 82' is inserted through the respective auxiliary support tube 40 until the flange 98 on the upper end of the pile 82' abuts the stop ring 56 fixed in the lower end. Grout 96 is then pumped into the upper end of the pile 82' and rises up to the abutting stop 56 and flange 98. Water trapped above the grout escapes through a bypass passage 85 and by the flange 98. A permanent packer 100, of one of the types well known in the art, is then lowered on a handling string (not shown) and is locked in place, gripping the inner wall of the respective tube 40 and abutting the upper face of the respective flange 98 on the respective pile 82' to hold rigidly the flange 98 between the permanent packer 100 and the stop ring 56.

When movement of the marine structure 10, during the setting up of the grout 96, prevents the proper bonding of the grout between the pile 82' and the auxiliary support tube 40, this problem is alleviated while utilizing the embodiment of FIGURE 12 by first forcing the auxiliary support tubes 40 several feet further into the formations underlying the marine bottom 12, by adjusting the weight of the structure 10, than the final prescribed distance. The piles 82' are then inserted through the auxiliary support tubes 40 into the formations underlying the marine bottom 12 until the piles 82' are at the prescribed depth with the flanges 98 on all of the piles 82' several feet above the stop rings 56 fixed in the lower ends of the respective auxiliary support tubes 40. The grout 96 is injected through the respective auxiliary support tubes 40 and piles 82' into the annuli between the piles 82' and foundation boreholes 80 in the formations underlying the marine bottom 12 to form composite metal and concrete piles four to four and one-half feet in diameter.

After the grout 96 has hardened in all of the primary foundation boreholes 80, cementing the piles 82' in the adjacent formations, the buoyancy of the marine structure 10 is slowly increased until the stop rings 56 in the lower ends of the auxiliary support tubes 40 abut the pile flanges 98, at which time the marine structure 10 is at its prescribed final height. The packers 100 are lowered in place through the auxiliary support tubes 40 and locked to hold the flanges 98 of the piles 82' between the packers 100 and the stop rings 56. The supporting of the marine structure 10 several feet below the prescribed final height during the setting up of the grout 96 around the piles 82' in the primary foundation boreholes 80 provides an open space between each of the flanges 98 on the piles 82' and each of the respective stop rings 56 in the lower ends of the auxiliary support tubes 40, isolating the piles 82' and the hardening grout 96 from any unavoidable vertical movement of the marine structure 10 in the body of water. The transmission of any slight tilting or rocking of the structure 10 can be avoided by providing a loose fit between the outer peripheries of the flanges 98 and the inner walls of the respective auxiliary support tubes 40.

In the last discussed procedure, all of the piles 82' have to extend up into the auxiliary support tubes 40 the same distance prior to being locked thereinto, and further, it is very difficult to raise the marine structure 10 several feet and control its ascent to such an extent that a very large impact is not created as the stops 56 abut the flanges 98. This impact is avoided while still isolating the grout setting up in the foundation boreholes 80 of the primary foundation by utilizing pairs of settable packer units 102, to prevent movement in either direction, as shown in FIGURE 13, instead of a flange 98, a stop ring 56, and a single packer 100, in each auxiliary support tube 40 of FIGURE 12. The procedure described with respect to the embodiment of FIGURE 11 is followed except that instead of using grout for bonding the piles 82 to the auxiliary support tubes 40, pairs of the settable packers 102 are inserted into each of the auxiliary support tubes 40 to grip both the outer walls of unflanged piles 82 and the inner walls of auxiliary support tubes 40 after the grout 96 has hardened between the piles 82 and the formations underlying the marine bottom 12, thereby isolating any movement of the marine structure 10 from the hardening grout 96. Such a packer unit sold by Cameron Iron Works is shown in the Composite Catalog of Oil Field Equipment, 1966 edition, published by World Oil, a Gulf Publishing Company, on page 1253. The various models thereof, of different sizes, are referred to by Cameron Iron Works Parts Nos. 665422–1, 625547–1, 667325–1, 667069–1, 670016–1, and 667723–1. The illustrated unit, with one set of slips on the inside and one set on the outside, will prevent movement in one direction only. Two of these units will be required to prevent any relative movement. Alternatively, a number of stacked packers of the more conventional type (at least four) could be utilized, alternate packers gripping first the outer walls of the piles 82 and the inner walls of the auxiliary support tubes 40.

In the embodiment of the marine structure 10, as illustrated in FIGURE 2, the well conductor pipes 38 are anchored in a very similar manner to the auxiliary support tubes 40. With the well conductor pipes 38, however, open spaces must be bridged between the lower end of each of the well conductor pipes 38 and the marine bottom 12. The open drill pipe string 83 can bridge these spaces if circulation returns are not needed. If returns are necessary, this can be accomplished with short piling sections, acting as marine conductors, which can be driven through the well conductor pipes 38 and a short way into the formations underlying the marine bottom 12 prior to drilling the foundation boreholes 80. To utilize a maximum inside diameter, as shown in FIGURE 6a, each of the piling sections 101 can be stored within a respective well conductor pipe 38 during fabrication of the marine structure 10. By tack-welding the piling sections 101 in place, they can be prevented from shifting while the marine structure 10 is being transported on the surface 14 of the body of water. A pile hammer dropped through each of the well conductor pipes 38, after the forming of the primary foundation, will break the welds and drive the respective piling section 101 a short distance into the formations underlying the marine bottom 12. When using piling sections 101, a stop ring inside of the lower end of the well conductor pipes 38 is not necessary for the capping of the lower end of the well conductor pipes 38 as previously described. Instead, the necessary caps 72' fitted within the lower end of each of the well conductor pipes 38 abut directly against the lower ends of the respective piling sections 101. The force of the pile hammer stroke used to dislodge the respective piling section 101 will break loose the cap 72' also, or air pressure applied through the valve 78 in the upper cap 76 can be utilized for this purpose.

After a foundation borehole 80 is drilled through a well conductor pipe 38, a pile 82 is lowered into the well conductor pipe 38 and is grouted in the respective foundation borehole 80 and the well conductor pipe 38. Since the marine structure 10 already has been securely fixed in the formations underlying the marine bottom through the auxiliary support tubes 40, there will be no problem with relative movement of the elements. If, however, it should be determined that grout bonds between the piles 82 and the respective well conductor pipes 38 are not strong enough, one of the procedures previously discussed for mechanically locking the piles 82 in the auxiliary support tubes 40 is used. If the embodiment of FIGURE 12 is decided on, where a stop ring in the well conductor pipe 38 is necessary for locking the piles 82′ in the well conductor pipes 38, the stop rings will be located above the stored position of the piling sections 101.

The above discussed use of piling sections 101, to bridge the distance between the lower end of the shell 26 and the marine bottom 12, in conjunction with those of the support tubes 28 terminating just below the lower end of the shell 26, also provides a solution to another problems which arises in certain situations. Twenty-inch piles 82 bridge the spaces between those of the thirty-inch support tubes 28 terminating just below the shell 26, and the composite concrete and steel piles, perhaps four and one-half feet in diameter in the formations underlying the marine bottom 12. Thus stress concentration is brought about in the smaller cross-sectional areas of the piles 82. In locations where violent storm conditions are prevalent, the reduction in the strength of the piles 82 may be critical. The piling sections 101, extending between the support tubes 28 and the marine bottom 12, however, provide an additional cross-sectional area.

The weight increase at the already heavier, lower end of the marine structure 10, as caused by the pre-installed piling sections 101 might have, in some instances, a detrimental effect during the transportation and erection of the structure 10. While the piling sections 101 could be separately transported to the site and lowered through the support tubes 28 subsequent to the marine structure being righted, this is only feasible if support tubes 28 are straight and extend to the production deck 16. A straight support tube 28 would permit just as large a diameter piling section 101 to be inserted through the upper end thereof as could be previously secured in the lower end. Howevr, any bend in the respective support tube 28 lessens the diameter of the piling section 101 that can be inserted therethrough, and proportionately, the strength of the anchoring foundation.

Another solution is illustrated in FIGURE 6b and will be discussed wtih respect to the embodiment of the marine structure 10 of FIGURES 1 and 2 where the well conductor pipes 38 function as the buoyancy/ballast tanks of the tilt control system. In this case, rather than terminating the well conductor pipes 38′ just below the lower end of the shell 26, they are extended so that they will penetrate the formation underlying the marine bottom 12 about ten feet or so less than the auxiliary support tubes 40. While the shorter well conductor pipes 38′ are forced beneath the marine bottom 12 and are placed under some strain, in the process, they are not subjected to the major strain, the impact load at the time the auxiliary support tubes 40 first come in contact with the marine bottom 12. To allow water to flow into and out of the lower ends of the well conductor pipes 38′, so that they can serve as buoyancy/ballast tanks after they have been driven into the formations underlying the marine bottom 12, a plurality of ports 107 ring each of the well conductor pipes 38′ at a level which will be just above the marine bottom 12 when the marine structure 10 is at its prescribed installation depth. Cylindrical shields 109, each closed at its lower end around a respective well conductor pipe 38′, mask the ports 107 thereof to permit fluid communication between the interiors of the well conductor pipes 38′ and the surrounding body of water while shielding the ports 107 in case any of the well conductor pipes 38′ are forced further into the marine bottom 12 than originally planned. The shields 109 also aid in the closing off of the ports 107 during the later grouting operation previously described. By pumping in enough grout through the included pile 82 (FIGURE 2), the returns rise in the well conductor pipes 38′ to the level of the ports 107. Rather than the grout returns just being squeezed out of the ports 107, and possibly not filling them, as might be the case if there were no shields, the shields 109 become filled with grout to at least above the ports 107. After the grouting operation there is no longer any passages for water to enter the lower ends of the well conductor pipes 38′.

The previously referred to tilt control system consists of an arrangement for redistributing the buoyancy between the various well conductor pipes 38 while holding the overall buoyancy of the marine structure 10 substantially constant. This is accomplished by pumping air, from well conductor pipes 38 on a side of the structure that is tending to rise, to the opposing well conductor pipes 38 on the opposite side of the marine structure 10 which is tending to dip, due to a couple imposed on the structure by wind or wave loads. The eccentric buoyant force produced by the tilt control system counteracts the wind or waves induced couple tending to rotate the marine structure 10 about a horizontal axis and stabilizes the marine structure 10 with the truncated upper end thereof held in a relatively horizontal plane. The replacing of the threaded caps 76 on the upper ends of the well conductor pipes 38, after the lower caps 72 thereof have been removed, permits the well conductor pipes 38 to serve as the buoyancy/ballast tanks, air being transferred between opposing pipes 38 through the valves 78 in the caps 76 (FIGURE 6) as previously described. The open lower ends of the well conductor pipes 38 (or ports 107) allow water to move in and out of the pipes as air is pumped out of or into the upper ends thereof, respectively.

Figure 14:
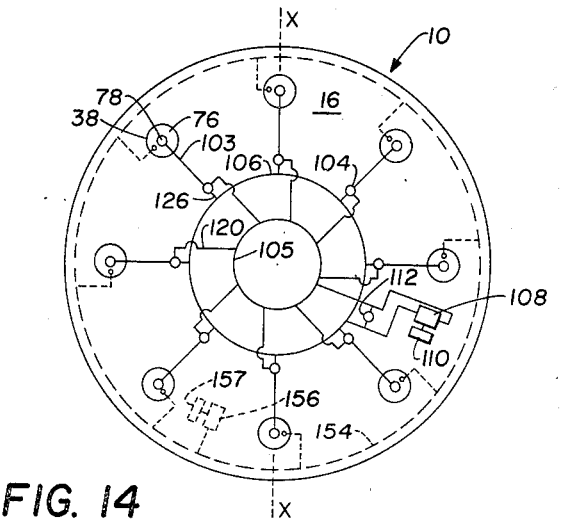
FIGURE 14 is a schematic representation of the fluid circuitry utilized with a tilt control system during the installation of the marine structure.

FIGURE 14 is a schematic plan view of the production deck 16 of the marine structure 10 with a representative showing of the pneumatic circuitry of the tilt control system. For purposes of clarity, only eight well conductor pipes 38, arranged in four opposing pairs, are illustrated although in the actual case all of the well conductor pipes 38, thirty-two of them (arranged in sixteen opposing pairs) in the illustrative model, would be utilized for this purpose. A pneumatic line 103 connects each of the valves 78 with one of a plurality of three-way, two-position solenoid control valves 104. The solenoid control valves 104 are each mounted so as to connect selectively the respective conduits 103 alternatively to an inner circular low pressure manifold 105 or an outer circular high pressure manifold 106. A gas pump 108 driven by a prime mover 110, such as a gasoline engine (also see FIGURES 1 and 2), is connected across manifolds 105 and 106 to provide a differential pressure. A bypass valve 112 is connected between the inlet and outlet of the pump 108 to limit the allowable differential pressure.

Figure 15:
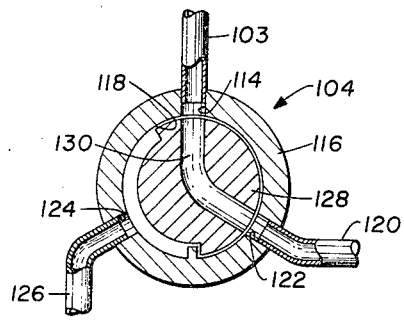
FIGURE 15 is a cross-sectional view of a solenoid actuated valve forming a part of the tilt control system.

FIGURE 15 illustrates, in cross section, the valve portion of one of the three-way, two-position solenoid control valves 104. A port 114 in the valve body 116 connects the interior of the pneumatic line 103 to a cylindrical cavity 118 within the valve body 116. The cavity 118 is connected to the low pressure manifold 105 by means of a pneumatic line 120 fixed in a radial port 122 spaced one hundred twenty degrees from port 116. A third radial port 124 is spaced one hundred twenty degrees from both ports 114 and 122. A pneumatic line 126, one end of which is fixed in the port 124, connects the cylindrical cavity 118 in the valve body 116 with the high pressure manifold 106. A cylindrical valve spool 128 is rotatably journaled in the cavity 118. The valve spool 128 has a passage 130 therethrough to connect alternately either of the pneumatic lines 120 or 126 to the pneumatic line 103 while blocking the other of the lines 120, 126. This arrangement provides a closed system with the pressurized air therein merely being shifted from one set of well conductor pipes 38 to another while the overall buoyancy of the marine structure remains substantially constant.

Figure 16:
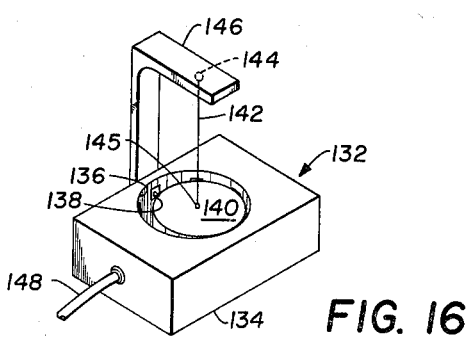
FIGURE 16 illustrates a tilt sensing device for actuating the tilt control system.

A tilt sensing device 132, as shown in FIGURE 16, controls the positions of the various valves 104 (FIGURES 14, 15, and 17) in reaction to any tilting of the marine structure 10 from the prescribed orientation. The tilt sensing device 132 consists of a base 134 having a vertical cylindrical well 136 therein. Electrical microswitches 138 are embedded at equally spaced positions around the wall of the well 136 in a single horizontal plane. The wall of the well, and therefore the outer faces of the microswitches, is the circumference of a circle whose axis is coincident with the center of a pendulum weight 140 hanging free when the marine structure is in the prescribed orientation. The pendulum weight 140 is suspended by a rod 142 universally mounted between a pair of ball joints 144 and 145, the ball joints 144 being attached to the upper support 146 centrally over the well 136 to allow the pendulum weight to swing freely. An electrical conduit 148 carries connections from the microswitches 138 to the solenoid valves 104.

Figure 17:
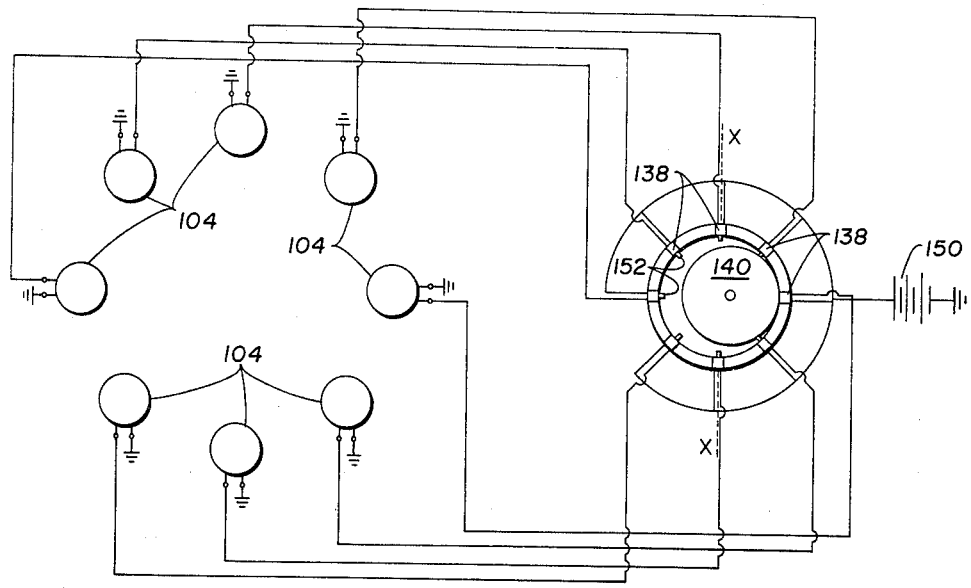
FIGURE 17 is a schematic representation of the electrical circuitry for controlling the tilt control system in response to the tilt sensing device.

Looking to the electrical schematic diagram of FIGURE 17, one electrical connection of each of the solenoid control valves 104 is connected to one side of a source of power 150 through a respective microswitch 138. As shown, a second electrical connection of each of the solenoid control valves 104, and the other side of the power source 150 are all grounded to complete a circuit when a respective microswitch 138 is actuated. With the rectilinearly actuated push button 152 of a respective microswitch 138 in the extended position, the circuit is open and the respective solenoid control valve 104 is in the relaxed position (with the valve spool 128 as is shown in FIGURE 15) wherein the pneumatic lines 103 and 120 are in operative connection to provide communication between the low pressure manifold 105 and the interior of the well conductor pipe 38. Conversely, with the push button 152 depressed, a circuit is completed through a solenoid valve 104 and the respective solenoid valve 104 is activated and rotates the valve spool 128 to provide an operative connection, by means of the passage 130, between the pneumatic lines 103 and 126 providing communication between the high pressure manifold 106 and the interior of the well conductor pipe 38. The pendulum weight 140, almost as large in diameter as well 136, is used so that all of the microswitches 138 to the low side of the horizontal axis of tilt X—X, as shown in FIGURE 17, are actuated. This causes air to be drawn from the well conductor pipes 38 to the left of the X—X axis into the low pressure manifold 105 and pumped through the high pressure manifold 106 into all of the opposing well conductor pipes 38 to the right of the X—X axis as shown in FIGURE 14. A pair of opposing well conductor pipes 38, lying directly on the X—X axis as shown in FIGURE 14, will both be connected to the low pressure manifold 105. Since they remain in relative balance this causes no problem.

The pneumatic tilt control system could be replaced by a liquid tilt control system using oil or water. An oil or water system would work substantially as described with respect to the pneumatic system; in such a liquid system, however, the caps on the lower ends of the well conductor pipes 38 would be permanently fixed thereon and would not be removed prior to the actuation of the system as previously described. With a liquid system, the upper ends of the well conductor pipes 38 could be left open and each of the lines 103 would then extend down into the appropriate well conductor pipe 38 as long as the differential height of the liquid column prescribed was not enough to generate a hydrostatic pressure greater than atmospheric (thirty-two feet for water). The fluid circuitry would be as shown in FIGURE 14. However, if a larger differential height were contemplated, submersible pumps would be required in each of the well conductor pipes 38 or the well conductor pipes 38 could be kept capped on top as well as on bottom, with the lines 103 extending through the caps and down into the respective well conductor pipes 38, the surface of the water in all well conductor pipes 38 being pressurized from a central manifold, indicated in phantom as 154, supplied with air under pressure from a compressor 156 driven by a prime mover 157. Although the above discussion of the tilt control system has been in conjunction with the embodiment of the marine structure 10 in which the well conductor pipes 38 function as the buoyancy/ballast tanks, the discussion would apply equally well to the embodiments in which the auxiliary support tubes 40 are used as the buoyancy/ballast tanks.

Figures 18, 19, 20, 21:
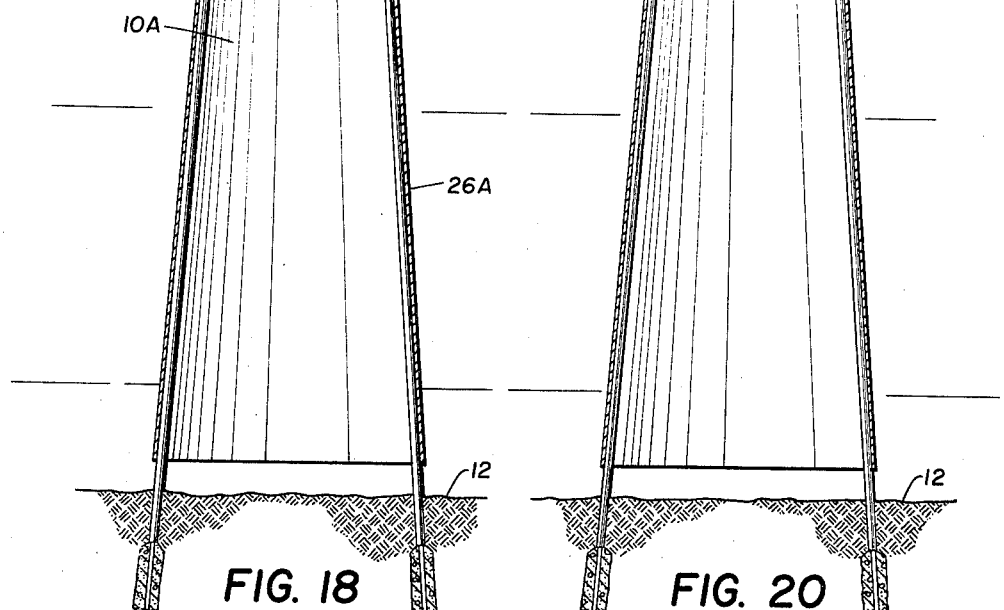
FIGURE 18 is a schematic cross-sectional view of an embodiment of the marine structure wherein alternate support tubes are brought through the shell.
FIGURE 19 is a cross-sectional view taken through line 19—19 of FIGURE 18.
FIGURE 20 is a schematic cross-sectional view of an embodiment of the marine structure wherein alternate support tubes form an interior ring within the shell.
FIGURE 21 is a cross-sectional view taken through line 21—21 of FIGURE 20.

FIGURES 18 and 19 illustrate another embodiment of the marine structure, generally indicated as 10A, in which the upper ends of the auxiliary support tubes 40A do not terminate within the shell 26A but instead are curved to intersect the shell 26A and pass up therethrough below the surface 14 of the body of water, extending to the overhang of the production deck 16A forming a ring of support tubes displaced outward of the well conductor pipes 38A. The auxiliary support tubes 40A are encased in an outer shell to form a splash shield 158 covering the area of the shell 26A over which there is a varying air-water interface. The splash shield 158 protects the shell 26A of the marine structure 10A against corrosion in this critical area near the upper end of the storage structure 10A. The upper ends of the auxiliary support tubes 40A can be supported on the outside of the shell 26A by being welded thereto, or as shown they can instead form a wider circle and partially support the vertical loads of production deck 16A mounted on the upper end of the storage structure 10A, while being laterally located thereby. An annular space 160 formed between the two shells 26A and 158 can also be used as a buoyancy chamber during the righting of the structure and there would be no need, in this case, to seal the upper space 33A above the roof 32A for this purpose. In this configuration, the previously described problems associated with the guiding of a drill pipe string into an auxiliary support tube, submerged far within a water-filled storage space, is avoided. However, with this configuration, the outer group of tubes 40A must be formed so as to emerge from shell 26A, with not less than a gradual five-thousand-foot radius bend. The outer group of tubes 40A passing through the shell 26A over such an extended distance tends to weaken the shell 26A. Furthermore, difficulties can be envisioned in fabricating such a structure with tubes intersecting the shell over at least forty or fifty feet of its length as would be necessary to have large radius bends in the tubes 40A. Preferably, from a structural standpoint, there would be a short dogleg section as illustratively shown in FIGURE 18. The dogleg would permit the auxiliary support tubes 40A to emerge from the shell 26A over a short distance. However, it is not believed to be possible to suspend a drill pipe string through such a dogleg without causing a fatigue failure in the drill pipe string.

In the configuration of the marine structure 10B shown in FIGURES 20 and 21, the auxiliary support tubes 40B are curved inward slightly, above the level to which their support for the shell 26B is needed, so as to come up displaced inward of the ring of substantially straight well conductor pipes 38B which are welded to the shell 26B. Each of the auxiliary support tubes 40B is welded to the two adjacent well conductor pipes 38B where it contacts them. Again, as long as a five-thousand-foot radius bend is held, which is no problem in this particular embodiment, a drill pipe string can function successfully through the auxiliary support tubes 40B. Further advantages of this configuration are that the integrity of the shell 26B is not broken and the diameter of the marine structure 10B at the air-water interface is kept at a minimum, which minimizes the loads on the structure due to winds and waves. A double shell at the air-water interface can be provided by welding an interior shell (not shown) either between the well conductor pipes 38B and the auxiliary support tubes 40B, or inside the ring of auxiliary support tubes 40B. The greater proportion of the waveloads, on a bottom-supported structure, extending above the surface, is concentrated within a narrow zone having the air-water interface as its upper limit. The decrease in the cross-sectional area of the marine structure 10B in this zone will sharply reduce these loads; furthermore, the double row of support tubes results in greater strength in the smaller diameter upper end of the marine structure 10B than in the other embodiments described. The only foreseeable problem is in forming and sealing the roof 32B across the double row of support tubes.

FIGURES 22 and 23 illustrate further modifications of the marine structure of the present invention. In FIGURE 22 there is shown a bottle-shaped configuration designated 10C which can be advantageously utilized where the water is not very deep and the production capacities of the wells drilled therefrom are quite high. This configuration allows the marine structure 10C to have a narrow neck at the air-water interface, while the shell cross-sectional area rapidly enlarges with depth into a main body portion to form a very large storage space beneath the turbulent zone just below the surface. The smoothly curving sections of the support tubes 28C, in the interconnecting portion of the structure between the neck and the main portion, are not disadvantageous as long as the previously discussed five-thousand-foot radius is held. In this modification, more than one length of auxiliary support tube is necessary to keep the maximum spacing between the support tubes within allowable limits. The support tubes 28C in this embodiment consist of well conductor pipes 38C extending all the way to the upper end of the marine structure 10C, an intermediate group of intermediate auxiliary support tubes 40C, and a group of short auxiliary support tubes 40C'. To avoid the problems associated with ending the auxiliary support tubes within the shell 26C, each of the auxiliary support tubes 40C and 40C' terminates at an intersection with the shell 26C in a port 162 and 162', respectively, extending through the wall of the shell 26C. To minimize the detrimental effect of these ports on the strength of the shell 26C, a strengthening ring (not shown) may be welded around each port 162, 162'. Guidelines or submersible vehicles having articulated manipulators can be utilized for guiding a drill pipe string from the production deck 16C into the selected ports 162, 162'.

The configuration of the shell 26D of the embodiment of FIGURE 23 is believed to be the most adaptable to a deep water site where an overly large storage space is not needed. Furthermore, the outwardly curving sides cause the marine structure 10D to have a small cross-sectional area near the water surface, while providing as large a foundation area as that of any previously described shell configurations. The shape of the shell 26D can be, for example, the surface of revolution of a parabolic or hyperbolic curve. While this embodiment can be supported as those previously described, the utilization of long laterally unbraced sections of support tubes 28D, of a hundred feet or more, between the shell 26D and the marine bottom 12, is illustrated here. The long laterally unbraced support tube sections will have almost no compressive strength and any tilting of the marine structure 10D will simply result in the support tubes 28D flexing as shown in phantom at 28D'. With the support tubes 28D being flexible the marine structure 10D will necessarily be kept buoyant at all times. However, in unconsolidated areas where it is difficult to provide a substantial enough foundation, it is advantageous to be able to limit the loads imposed on the foundation by isolating the foundation from the cantilever loads generated by bending the marine structure 10D.

Although the largest number of levels of auxiliary support tubes shown in any of the embodiments above is only two, this is not meant to imply that any number of levels of auxiliary support tubes cannot be used. The number of levels depends on the allowable spacing between adjacent support tubes, the configuration of the particular marine structure, and its size.

The drilling of a well from the production deck, through the unobstructed throughbore of one of the support tubes 28 and the respective pile 82 locked therewithin is similar to the procedure followed when drilling from any fixed platform. Those of the support tubes 28 through which the drilling is done, referred to previously as well conductors pipes 38, function as marine risers, the piles anchored therethough functioning as surface casing if they are deep enough. If a pile 82 is to be used as surface casing, it is extended back to the surface by an extension riser (not shown) and a blowout preventer (also not shown) is affixed to the upper end on the deck 16. If the pile 82 does not extend deep enough (six hundred to fifteen hundred feet) to function as surface casing, the borehole 80 will be continued after the pile 82 is set and a surface casing hung therein and extended to the production deck 16 where a blowout preventer is attached. The surface casing and all subsequent strings, including the production tubing, will be hung in the upper end of the pile itself or in a wellhead mounted on the upper end of the pile 82 in the lower end of the support tube 28. If the pile 82 were to be extended to the surface, the wellhead would be between the pile and the pile extension.

The wellhead apparatus, necessary for hanging all of the casing and tubing strings far below the production deck and extending at least selected strings up to the deck where a production wellhead or Christmas tree is fixed (as shown in FIGURE 1), is commonly called a "mud-line suspension system." Such systems are readily available from all of the major offshore equipment manufacturers. By utilizing such equipment, the weight of the strings of casing and tubing is transferred directly to the formations underlying the marine bottom and not through the marine structure 10 as would be the case if the strings were hung from the production deck.

In the preceding discussion it has been contemplated that the wells only would be drilled through those of the support tubes 28 referred to as well conductor pipes 38. If for some reason, more wells were needed than the number of well conductor pipes provided, the auxiliary support tubes 40 could also be utilized. While with the embodiment of FIGURES 20 and 21 this use of the auxiliary support tubes would entail no modifications, there is no reason why such a program could not be carried out with a marine structure constructed in accordance with any of the disclosed embodiments. For example, with the embodiment shown in FIGURE 2, a permanent marine riser or conductor pipe would have to be connected between the upper end of the respective auxiliary support tube and the production deck. Since it is contemplated that a temporary riser can be used for drilling the foundation borehole, there is no apparent reason why a similar piece of apparatus cannot be used for drilling and producing a well through an auxiliary support tube 40.

If it is desirable to utilize the marine structure 10 also for the storage of fluid minerals produced from wells at a distance from the erection side, some of the support tubes 28, not used as well conductor pipes, can be utilized as production risers to conduct the produced minerals, transported to the structure across the marine bottoms from the subsea wellheads, to the production facilities on the production deck 16. Such a modification is illustrated in FIGURE 2, at the lower left-hand portion of the drawing where a production wellhead 164 of a well 166 is connected into the interior of a support tube 28 adjacent the marine bottom 12 by means of a flowline 168. The minerals can be conveyed up directly within the support tubes 28 or in flowlines supported therewithin. In fact, in some instances, particularly where wide well spacing is necessary most or all of the wells can be drilled at points removed from the marine structure 10, and the support tubes 28 will then function only as production risers.

Although the present invention has been described in conjunction with details of specific embodiments thereof, it is to be understood that such details are not intended to limit the scope of the invention. The terms and expressions employed are used in a descriptive and not a limiting sense and there is no intention of excluding such equivalents in the invention described as fall within the scope of the claims. Now having described the invention herein disclosed, reference should be had to the claims which follow.

What is claimed is:

1. A marine structure to be installed at a deep water site of subaqueous fluid mineral deposits, said marine structure comprising a skeletal arrangement of support tubes, an enclosing shell, means for securing said shell to said support tubes continuously along the portions of a plurality of said support tubes of said skeletal arrangement of support tubes, said shell defining, at least in part, a storage space within said marine structure, at least some of said support tubes extending beyond said shell so as to be adapted to extend into formations underlying the marine bottom to form a portion of a foundation for anchoring said marine structure at a site; and at least some of said support tubes being adapted to function as well conductor pipes for subaqueous wells completed therethrough.

2. The marine structure of claim 1 wherein the configuration of said shell is that of a surface of revolution, the axis of said surface of revolution being vertically oriented when said marine structure is installed at a deep water site.

3. The marine structure of claim 2 wherein said configuration of said shell is substantially that of a truncated cone.

4. The marine structure of claim 2 wherein said configuration of said shell is described by the surface of revolution of a parabolic curve.

5. The marine structure of claim 2 wherein said configuration of said shell is described by the surface of revolution of a hyperbolic curve.

6. The marine structure of claim 2 wherein said shell is bottle shaped with a narrow neck of minimum cross-sectional area at the air-water interface; a main body portion of maximum cross-sectional area beneath the turbulent zone just below the water surface; and a smoothly curving interconnecting portion therebetween.

7. The marine structure of claim 1 wherein a deck is fixed thereto spaced above said shell, and at least some of said support tubes, adapted to function as well conductor pipes, extend to said deck.

8. The marine structure of claim 1 wherein said shell is of such a length that it extends from a level spaced above said marine bottom to a level above the surface of said body of water when said structure is in place at said deep water site; a drilling and production deck fixed to the marine structure adjacent the upper end of said shell; and said at least some of said support tubes, adapted to function as well conductor pipes, extending from said drilling and production deck to the lower end of said shell.

9. The marine structure of claim 7 wherein said shell has a first end and a second end, said second end having a smaller cross-sectional area than said first end, said first and second ends being spaced apart with said support tubes of said skeletal arrangement of support tubes being located so as to generally extend axially therebetween, said skeletal arrangement of support tubes at said second end of said shell comprises less than the number of support tubes at said first end.

10. The marine structure of claim 9 wherein at least a plurality of those of said support tubes not comprising said skeletal arrangement of support tubes at said second end of said shell terminate between said ends of said shell.

11. The marine structure of claim 9 wherein at least a plurality of those of said support tubes not comprising said skeletal arrangement at said second end of said shell are displaced, at said second end of said shell, inward of those of said support tubes forming said skeletal arrangement at said first end of said shell.

12. The marine structure of claim 9 wherein at least a plurality of those of said support tubes not comprising said skeletal arrangement at said second end of said shell, enclosing said skeletal arrangement of support tubes, intersect said shell between the ends thereof and extend at least so far as to be intersected by an imaginary plane coincident with to said second end of said shell and displaced outward of said shell.

13. The marine structure of claim 12 wherein there is an outer shell secured to said plurality of those of said support tubes not comprising said skeletal arrangement at said small end of said first shell, said previously recited shell being referred to hereafter as the first shell and said outer shell being referred to hereafter as said second shell, said second shell being located so as to span the air-water interface when said marine structure is installed at said deep water site.

14. The marine structure of claim 10 wherein each of those of said support tubes terminating between said ends of said shell intersects said shell to form a port through said shell and into said respective support tube.

15. The marine structure of claim 1 wherein those of said support tubes adapted to function as well conductor pipes do not extend as far beyond said shell as others of said support tubes adapted to form a portion of a primary foundation.

16. The marine structure of claim 15 wherein those of said support tubes adapted to function as well conductor pipes extend beyond said shell so as to terminate above said marine bottom when said marine structure is installed at a site.

17. The marine structure of claim 15 wherein those of said support tubes adapted to function as well conductor pipes extend far enough beyond said shell so as to terminate in said formations underlying said marine bottom when said marine structure is installed at a site.

18. A marine structure installed at a deep water site of subaqueous fluid mineral deposits, said marine structure comprising a skeletal arrangement of support tubes, an enclosing shell, means for securing said shell to said support tubes continuously along the portions of a plurality of said support tubes of said skeletal arrangement of support tubes, said shell defining, at least in part, a storage space within said marine structure; at least some of said support tubes extending below said shell and into the formations underlying a marine bottom to form at least a portion of a foundation anchoring said marine structure at said site; and at least some of said support tubes being well conductor pipes for subaqueous wells drilled and completed therethrough.

19. The marine structure of claim 18 wherein production wellheads are located at the upper end of said marine structure, each of said production wellheads being operatively connected with a subaqueous well through a respective one of said support tubes designated as well conductor pipes.

20. The marine structure of claim 18 wherein those of said support tubes extending below said shell and forming a portion of said foundation in said formations underlying said marine bottom are of such a number and each is of such a laterally unsupported length, between the lower end of said shell and said marine bottom, so as to transmit cantilever loads from said marine structure to said foundation.

21. The marine structure of claim 18 wherein those of said support tubes extending below said shell and forming a portion of said foundation in said formations underlying said marine bottom are of such a number and each is of such a laterally unsupported length, between the lower end of said shell and said marine bottom, so as to flex freely and transmit no substantial cantilever loads from said marine structure to said foundation.

22. The marine structure of claim 18 wherein said foundation comprises a single pile extending down directly through each of said support tubes forming a portion of said foundation; means for cementing each of said piles into said formations underlying said marine bottom; and means for locking each of said piles within the respective support tube.

23. The marine structure of claim 22 wherein said means for locking a pile within a respective support tube comprises a stop ring fixed within said support tube through which said pile extends; an outwardly extending flange on said pile within said support tube abutting the upper face of said stop ring; and a settable packer locked in said support tube while abutting the upper face of said flange to prevent upward movement of said pile in said support tube.

24. The marine structure of claim 22 wherein said means for locking a pile within a respective support tube comprises packer means locked to said inner wall of said support tube and the outer wall of said pile whereby relative movement between said support tube and said pile is prevented.

25. A method for installing a marine structure at a deep water site of subaqueous fluid mineral deposits, said marine structure comprising a skeletal arrangement of support tubes, an enclosing shell, means for securing said shell to said support tubes continuously along the portions of a plurality of said support tubes of said skeletal arrangement of support tubes within said shell, said shell defining, at least in part, a storage space within said marine structure; at least some of said support tubes extending beyond said shell; said method including the following steps:

(a) righting and buoyantly supporting said marine structure at said site with the portions of said support tubes extending beyond said shell depending toward said marine bottom;

(b) lowering said righted marine structure until at least some of said support tube depending portions are embedded in the formations underlying said marine bottom;

(c) stabilizing said marine structure to prevent rotation of said marine structure about a horizontal axis;

(d) lowering said stabilized and buoyantly supported marine structure to the final prescribed depth;

(e) forming foundation boreholes in said formations underlying said marine bottom through at least some of said support tubes;

(f) setting a pile in each of said support tubes through which a foundation borehole has been formed;

(g) cementing each of said set piles into said formations underlying said marine bottom, while said marine structure is stabilized, to form a portion of a foundation for said marine structure; and (h) locking each of said piles into said respective support tube.

26. The method for installing a marine structure as recited in claim 25 wherein the stabilizing of said buoyantly supported marine structure is accomplished by utilizing certain of said support tubes as buoyancy/ballast tanks of a tilt control system.

27. The method for installing a marine structure as recited in claim 25 wherein means for locking each of said piles into said support tubes comprises a stop ring fixed in each of said support tubes; an outwardly extending flange on each of said piles adapted to abut the upper face of the respective one of said stop rings; and packer means lowered through each of said support tubes and adapted to lock to the inner walls of said support tubes above said flanges on said piles to hold said flanges tightly between said packer means and said stop rings, including the following additional steps:

(i) lowering said stabilized and buoyantly supported marine structure to a depth below the final prescribed installation depth prior to cementing said piles into said formations underlying said marine bottom to isolate said pile and the hardening cementing means from any vertical movement of said stabilized marine structure;

(j) raising said marine structure, after all of the piles of at least a primary foundation have been cemented into the formations underlying said marine bottom and the cementing means has hardened, until said stop rings within said support tubes abut said flanges of said piles;

(k) lowering packer means through each of said support tubes to abut the upper faces of each of said respective flanges; and (l) setting said packer means to prevent relative movement between said piles and said support tubes.

28. The method for installing a marine structure as recited in claim 27 wherein said raising and lowering of said marine structure are accomplished by adjusting the buoyancy of said marine structure.

29. The method for installing a marine structure as recited in claim 28 wherein the buoyancy of said marine structure is adjusted by changing the volume of air in said storage space within said shell of said marine structure.

30. A marine structure of claim 1 wherein said storage space within said shell is capped by a roof spanning said shell, the lower end of said shell being open to provide communication between said storage space and the surrounding body of water when said marine structure is installed at a deep water site.

31. The marine structure of claim 10 wherein said storage space at second end of said shell is capped by a roof spanning said shell, the first end of said shell being open to provide communication between said storage space and the surrounding water when said marine structure is installed at a deep water site with said first end situated at the lower end of said marine structure as installed, a conduit means depending from said roof into said storage space below the water level when air is to be trapped under said roof for providing buoyancy, and above the level of termination of said plurality of support tubes not comprising said skeletal arrangement at said smaller end of said shell whereby foundation boreholes can be drilled through said depending conduit means and said plurality of support tubes terminating between said ends of said shell without releasing air trapped beneath said roof to provide buoyancy while installing said marine structure.

32. The marine structure as recited in claim 31 wherein there is means for guiding a drill pipe string from said conduit means to each of said plurality of support tubes terminating between said ends of said shell.

33. The marine structure as recited in claim 32 wherein said means for guiding a drill pipe string includes at least one flexible guideline extending between each of said support tubes and a point above said roof through said depending conduit.

34. A method for installing a floating structure at a marine site, said structure having a longitudinal dimension which is parallel to the surface of the body of water as the structure is transported to a marine site and is to be vertical when installed at said site, said structure having a large interior hollow space and being open at one end, including the following steps:

(a) shifting the center of buoyancy of said structure at a controlled rate to lower a first end of said structure into the water at a controlled rate;

(b) simultaneously with step (a), locating the second end of said structure with respect to the water surface;

(c) as said structure approaches a vertical orientation, adjusting the buoyancy of said structure to lower said structure until the lower end of said structure is at least partially embedded in the marine bottom;

(d) orienting said structure in the prescribed final vertical orientation; and (e) anchoring said structure in the vertically oriented position.

35. A method for installing a floating structure at a marine site as recited in claim 34 wherein said means for locating said second end at said water surface comprises a buoyancy chamber located within said second end of said structure.

36. A method for installing a floating structure at a marine site as recited in claim 35 wherein said structure is provided with a large storage space in open communication with said body of water at said first end of said structure and a buoyancy chamber located within the first end of said structure whereby the flooding of said buoyancy chamber controls the lowering of said first end of said structure into said body of water.

37. A marine structure as recited in claim 1 wherein each of said support tubes, over the length of said shell, are open in cross section, the open sides of said support tubes contacting the inner wall of said shell and being welded thereto.

38. A marine structure to be installed at a deep water site of subaqueous fluid mineral deposits, said marine structure comprising a skeletal arrangement of support tubes, an enclosing shell secured to said support tubes, and defining, at least in part, a storage space within said marine structure; at least some of said support tubes extending beyond said shell so as to be adapted to extend into formations underlying the marine bottom to form a portion of a foundation for anchoring said marine structure at a site; and at least some of said support tubes being adapted to function as well conductor pipes for subaqueous wells completed therethrough; said marine structure being adapted to be oriented at a marine site so that said support tubes extend generally vertically, each of said support tubes being hollow and capped at the ends thereof prior to installation of said structure at said marine site; removable and replaceable cap means at the upper ends of a group of said support tubes which extend to the upper end of said structure; and removable cap means at the lower ends of each of said support tubes.

39. A marine structure as recited in claim 38 wherein there is means for releasing said lower caps of said support tubes from the upper end of said marine structure.

40. A marine structure to be installed at a deep water site of subaqueous fluid mineral deposits, said marine structure comprising a skeletal arrangement of support tubes, an enclosing shell secured to said support tubes, and defining, at least in part, a storage space within said marine structure; at least some of said support tubes extending beyond said shell so as to be adapted to extend into formations underlying the marine bottom to form a portion of a foundation for anchoring said marine structure at a site; and at least some of said support tubes being adapted to function as well conductor pipes for subaqueous wells completed therethrough; said marine structure being adapted to be oriented at a marine site so that said support tubes extend generally vertically, each of said support tubes being hollow and capped at the ends thereof prior to installation of said structure at a marine site; removable cap means at the upper and lower ends of a group of said support tubes which do not extend to the upper end of said marine structure; and means for releasing at least said upper cap means of said group of support tubes from said upper end of said marine structure.

41. A marine structure as recited in claim 38 wherein each of said support tubes has at least one port through the lower end thereof, and shield means for providing communication between the hollow interior of said support tube and said body of water above said shield means, said shield means being fixed to the outer wall of said support tube and masking said port for aiding in the plugging of said port in the later cementing operation while preventing said port from becoming plugged as said support tube is embedded in the formations underlying a marine bottom.

42. A marine structure to be installed at a deep water site of subaqueous fluid mineral deposits, said marine structure comprising a skeletal arrangement of support tubes, an enclosing shell, means for securing said shell to said support tubes continuously along the portions of a plurality of said support tubes of said skeletal arrangement of support tubes, said shell defining, at least in part, a storage space within said marine structure; at least some of said support tubes extending beyond at least one end of said shell so as to be adapted to extend into formations underlying the marine bottom to form a portion of a foundation for anchoring said marine structure at a site; and means for providing fluid paths through at least some of said support tubes which are adapted to function as production risers to convey fluid minerals from flowlines on the marine bottom to production facilities on the upper end of said marine structure, each of said flow paths connecting the interior of a support tube between; a first port through the wall of said support tube between said one end of said shell and the end of said support tube extending beyond said one end of said shell, and the far end of said support tube at least adjacent the other end of said shell.

43. A marine structure to be installed at a deep water site of subaqueous fluid mineral deposits, said marine structure comprising: a skeletal arrangement of support tubes; an enclosing shell, means for securing said shell to said support tubes continuously along the portions of a plurality of said support tubes of said skeletal arrangement of support tubes, said shell defining, at least in part, a storage space within said marine structure; at least some of said support tubes extending beyond said shell so as to be adapted to extend into formations underlying the marine bottom to form a portion of a foundation for anchoring said marine structure at a site; a tilt control system for stabilizing said marine structure utilizing at least one pair of said support tubes as buoyancy/ballast tanks, said pair of buoyancy/ballast tanks being arranged in opposing relationship; means for sensing a tilting of said structure from a prescribed orientation, means for shifting a fluid between opposing buoyancy/ballast tanks to counteract the tilting of said structure, and means for controlling said shifting means in response to said tilt sensing means.

44. A marine structure as recited in claim 43 wherein said tilt sensing means comprises a universally mounted pendulum weight.

45. A marine structure as recited in claim 44 wherein said tilt control system comprises electrical switches arranged in a plane and equally spaced on the circumference of a circle whose axis is coincident with the center of said pendulum weight hanging free when said marine structure is floating in a body of water in said prescribed orientation and means for shifting said buoyancy/ballast fluid in an opposing pair of buoyancy/ballast tanks in response to the actuation of a respective switch by said pendulum weight whereby the tilting of said floating structure away from said prescribed orientation causes said pendulum weight to move over against at least one of said switches and actuate said at least one of said switches to shift said buoyancy/ballast fluid to oppose the tilting of said floating marine structure.

46. A marine structure as recited in claim 43 wherein said buoyancy/ballast fluid of said tilt control system is air.

47. A marine structure as recited in claim 43 wherein said buoyancy/ballast fluid of said tilt control system is water.

48. A marine structure as recited in claim 43 wherein said means for shifting a fluid between opposing buoyancy/ballast tanks of said tilt control system comprises a low pressure manifold; a high pressure manifold; a control valve means in conjunction with each of said buoyancy/ballast tanks for selectively operatively connecting said high pressure manifold and said low pressure manifold to said respective buoyancy/ballast tank; and a pump means connected between said high pressure manifold and said low pressure manifold to maintain a differential pressure therebetween.

49. A marine structure as recited in claims 48 wherein the buoyancy/ballast fluid of said tilt control system is water, said buoyancy/ballast tanks each being closed at the upper and lower end; means for pressurizing the surface of the water within said buoyancy/ballast tanks, said pressurizing means including an air pressure manifold operatively connected to said upper end of each of said buoyancy/ballast tanks; and means for supplying air under pressure to said air pressure manifold.

50. The marine structure of claim 19 wherein fluids are produced from deposits located in formations underlying the marine bottom through siad wellheads; means for gathering said produced fluids on an above-surface deck and means for directing said gathered produced fluids into said storage space.

51. A production system comprising: a marine structure installed at a deep water site of subaqueous fluid mineral deposits, said marine structure comprising a skeletal arrangement of support tubes, an enclosing shell, means for securing said shell to said support tubes continuously along the portions of a plurality of said support tubes of said skeletal arrangement of support tubes, said shell defining at least in part, a storage space within said marine structure, at least some of said support tubes extending below said shell and into the formations underlying a marine bottom to form at least a portion of a foundation anchoring said marine structure at said site; subsea wellheads located at points spaced from said marine structure, at least one fluid line interconnecting each of said subsea wellheads with the interior of a support tube, designated as a marine riser, at said marine bottom; a flow path within each of said support tubes, designated as a marine riser, to direct fluid produced through at least one of said subsea wellheads to the upper end of said marine structure; means at said upper end of said marine structure for gathering the produced fluid from a plurality of support tubes designated as marine risers; and means for directing said gathered produced fluid into said storage space enclosed at least in part by said shell.

References Cited

UNITED STATES PATENTS

| | | | |
|---|---|---|---|
| 2,740,261 | 4/1956 | Stark | 61—46.5 |
| 2,947,437 | 8/1960 | Greer | 61—46 X |
| 3,036,438 | 5/1962 | Sims | 61—46.5 X |
| 3,128,604 | 4/1964 | Sandberg | 61—46.5 |
| 3,191,388 | 6/1965 | Ludwig | 61—46.5 |
| 3,209,544 | 10/1965 | Borrman | 61—46.5 |
| 3,347,052 | 10/1967 | Steitle et al. | 61—46.5 |
| 3,362,170 | 1/1968 | Manning | 61—45.5 |
| 3,396,544 | 8/1968 | Manning | 61—46.5 |

JACOB SHAPIRO, Primary Examiner

U.S. Cl. X.R.

61—53; 114—12.1; 175—7; 220—1, 13